US012689321B2

(12) United States Patent
Mascolo et al.

(10) Patent No.: US 12,689,321 B2
(45) Date of Patent: Jul. 21, 2026

(54) SOLUTIONS FOR PHOTOVOLTAIC MODULES WITH INTEGRATED MOUNTING SYSTEMS

(71) Applicant: LITESPEED ENERGY, INC., Livermore, CA (US)

(72) Inventors: Gianluigi Mascolo, Monte Sereno, CA (US); Karl-Josef Kramer, Livermore, CA (US)

(73) Assignee: LITESPEED ENERGY, INC., Livermore, CA (US)

( * ) Notice: Subject to any disclaimer, the term of this patent is extended or adjusted under 35 U.S.C. 154(b) by 316 days.

(21) Appl. No.: 17/434,741

(22) PCT Filed: Mar. 4, 2020

(86) PCT No.: PCT/US2020/020855
§ 371 (c)(1),
(2) Date: Aug. 28, 2021

(87) PCT Pub. No.: WO2020/180906
PCT Pub. Date: Sep. 10, 2020

(65) Prior Publication Data
US 2022/0123688 A1 Apr. 21, 2022

Related U.S. Application Data

(60) Provisional application No. 62/814,799, filed on Mar. 6, 2019.

(51) Int. Cl.
*H02S 20/23* (2014.01)
*F24S 25/33* (2018.01)
(Continued)

(52) U.S. Cl.
CPC .............. *H02S 20/23* (2014.12); *H02S 20/24* (2014.12); *H02S 30/10* (2014.12); *H02S 30/20* (2014.12); *F24S 25/33* (2018.05)

(58) Field of Classification Search
CPC .......... H02S 20/23; H02S 20/24; H02S 30/10; F24S 2025/014
See application file for complete search history.

(56) References Cited

U.S. PATENT DOCUMENTS

| 2003/0010372 A1 * | 1/2003 | Dinwoodie ............. H02S 20/23 |
| | | 52/173.3 |
| 2009/0320908 A1 * | 12/2009 | Botkin .................. F24S 80/457 |
| | | 136/251 |

(Continued)

FOREIGN PATENT DOCUMENTS

| NL | 1042200 B1 * | 7/2018 | ............. H02S 20/24 |

*Primary Examiner* — Kourtney R S Carlson
(74) *Attorney, Agent, or Firm* — Command IP LLP; Michael Zarrabian

(57) ABSTRACT

Embodiments of solutions for PV modules with integrated mounting systems are presented. Application of the systems are found primarily but not solely in commercial and industrial rooftop solar installations. The disclosed solutions allow for a very flexible use of said PV modules with integrated mounting systems in various installation situations, with a focus on demonstrating concepts that show direct applicability of mounting featured for adhesive as well as for ballasted solutions, as well as the combination of both. Support features that enable ergonomic transport and installation are highlighted. Features for alignment, for providing structural strength as well as reliable, strong, yet accommodating interlinkage of PV modules are disclosed. The use of polymeric or fiber reinforced polymeric frames and mounting structures eliminates the need for grounding. Features are presented which a focus on not requiring tooling or hardware along with the installation.

20 Claims, 27 Drawing Sheets

(51) Int. Cl.
   *H02S 20/24*          (2014.01)
   *H02S 30/10*          (2014.01)
   *H02S 30/20*          (2014.01)

(56)                    References Cited

U.S. PATENT DOCUMENTS

| 2012/0023728 A1* | 2/2012 | Britcher | ................... | B61B 5/02 |
| | | | | 254/2 R |
| 2012/0298201 A1* | 11/2012 | Stephan | ................. | H02S 30/20 |
| | | | | 136/259 |
| 2014/0069485 A1* | 3/2014 | Rawlings | ............... | F24S 25/00 |
| | | | | 136/251 |
| 2015/0180405 A1* | 6/2015 | West | ....................... | H02S 20/24 |
| | | | | 136/251 |
| 2017/0133973 A1* | 5/2017 | Mascolo | ................. | H02S 30/10 |

* cited by examiner

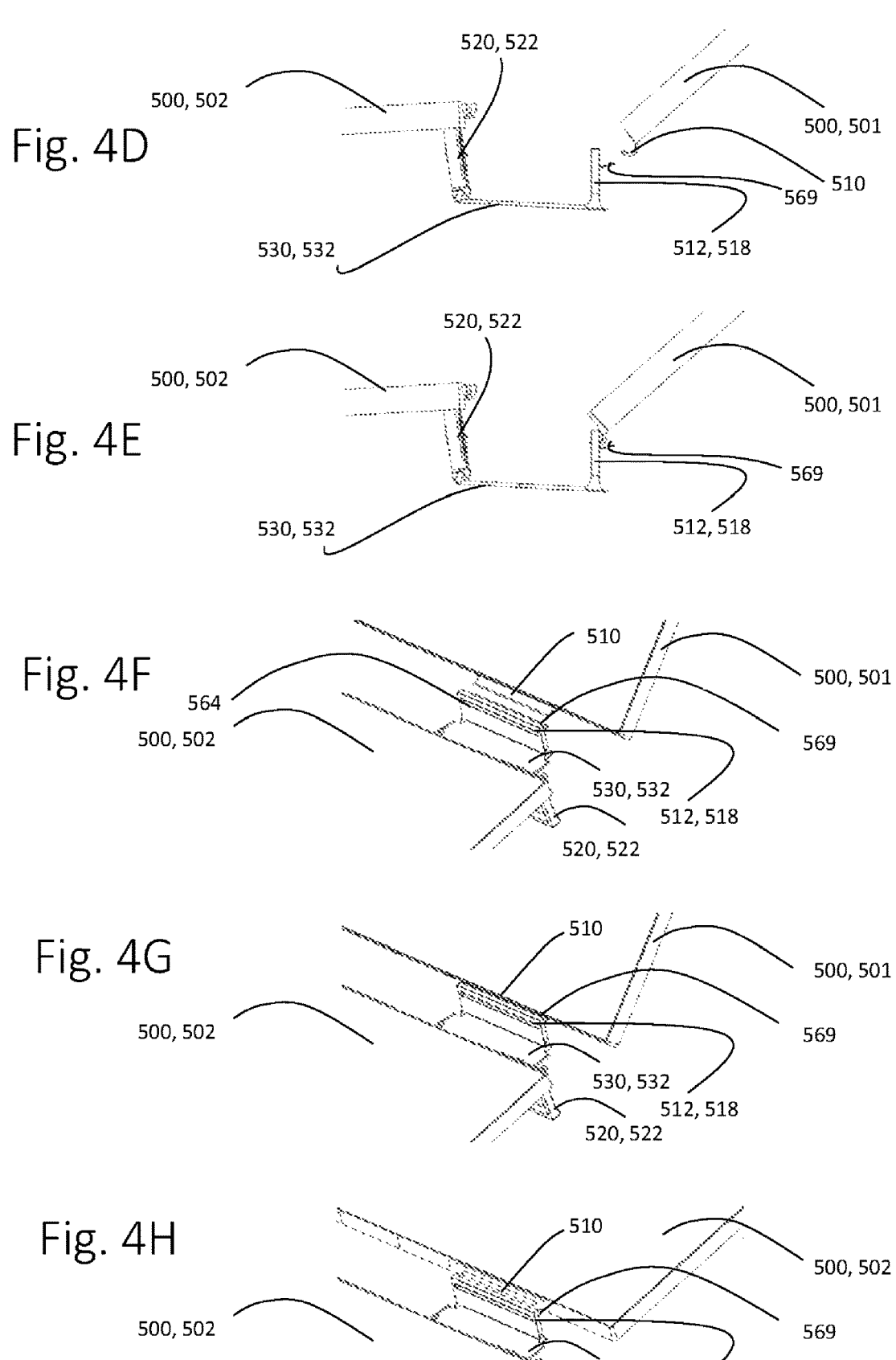

SOLUTIONS FOR PHOTOVOLTAIC MODULES WITH INTEGRATED MOUNTING SYSTEMS

CROSS-REFERENCE TO RELATED APPLICATIONS

This application claims priority to U.S. Provisional Application Ser. No. 62/814,799, filed Mar. 6, 2019, which is hereby incorporated by reference in its entirety.

FIELD OF THE INVENTION

The present technology relates to photovoltaic modules and mounting systems.

BACKGROUND

The cost of photovoltaic (PV) modules has dropped significantly over the last ten years. This reduction in cost has turned the focus of photovoltaic system and project costs to the Balance of System (BOS). It is therefore mandatory that installing PV modules needs to become cheaper overall, with savings harvested especially on hardware cost, ease, speed and efficiency of installation. All this is needed to continue to enable solid growth in the PV solar market.

The use of lighter weight modules and racking systems increases the overall available market, especially for commercial and industrial rooftops, especially to those roofs that are not strong enough to support heavy ballasted PV systems.

Systems not requiring roof penetration for installation are desirable to readily retain roof warranties.

Lighter panels and installation systems need to be designed to pass certification and have the necessary strength and resistance against wind, snow load and fire.

Systems that are straightforward and fast to install save costs and enhance the distribution of solar power in regions where technology expertise is hard to come by.

BRIEF SUMMARY OF THE INVENTION

The presented invention enables bringing modules onto rooftops as an all-in-one package. In addition, it enables fast installation that can be carried out by a single person. Quick, yet secure roof installation, attachment and interlocking of modules and arrays of modules is achieved.

The presented invention also enables, for substantially the same module and installation geometries, various methods of attachment to roof tops, namely adhesive, ballasted and fixation by fasteners that penetrate rooftops.

This disclosure primarily envisions firstly the use of an unframed photovoltaic solar module laminate, such as but not limited to a 60 or 72 cell photovoltaic module, made of for instance 60 or 72 multi- or monocrystalline silicon solar cells of 156 mm or so on a side. The same features apply to the use of other solar cell and module materials such as gallium arsenide or thin film module, for instance but not limited to thin film modules comprised of CIGS or CdTe or perovskite technology or combinations thereof. With suitable adaptations, the presented features can be applied to framed photovoltaic modules as well. Their use and application is envisioned and enclosed in full in this disclosure.

In this invention, said solar module laminate is enclosed by an essentially rectangular molded frame and glued or mechanically attached to the frame, including for instance in such a way as to leave a gap around the perimeter of the laminate that enables easy water drainage from the laminate surface and thus reduces build-up of dirt along the edges of the module. Such a feature is particularly envisioned for the low edge of the module, where gravity will tend to accumulate water residue. The rectangular frame also serves to provide the kind of protection and structural strength that a standard aluminum frame provides.

The mounting structure that serves to secure the module to the roof is attached during the manufacturing process of the frame to the module frame, preferably, but not limited to, the underside of the panel, in a folded and nested way. The attachment is preferably done in such a way that the overall form factor of the panel is not or only slightly increased, especially in the two long directions of the panel. By assuring such attachment of the mounting structure to the panel it is assured that the panel, with its mounting structure attached, can be carried to its designated installation location on the roof, without the need of carrying any peripheral mounting structure components or tools, and can be carried to its location by a single person and also be installed by a single person. That person doesn't necessarily need to be highly skilled to install the presented integrated solar systems, since this invention makes the installation very straightforward.

Keeping the outside dimensions of the module with frame including the racking components essentially the same as the module with frame assures that the shipping density can be significantly higher than for such modules that have separated racking components. Practically, the mounting components are incorporated in the silhouette and maximum dimensions of the frame of the laminate. Shipping cost can thus be significantly reduced.

Also, the module and system design is such that no packaging or wrapping material and spacers between modules are needed and therefore there is very little material cleanup and removal effort required on the roof after the installation. This offers significant savings to installers and developers of solar projects.

We present various concepts, including a structure allowing integrated module with installation system that can be stacked at essentially the same formfactor and density as modules, either by nesting deflector and feet within the frame for shipment or by nesting feet underneath deflector and within the thickness confines of the frame. This embodiment includes mount feet, a rotatable attachment inside a mount frame that allows to pivot a module frame and connect with mount feet of adjacent modules. In the presented invention, we focus on concepts which allow for the use either of adhesive which is applied to the underside of mounting feet or of ballast weights to be placed on top of said mounting feet, instead of or in addition to said adhesive mounting to the roof, all while avoiding shading from said ballast weights. Additional ballast trays are also presented for high load applications. Such embodiments are enabled by having an elevating bar feature added along the south edge of the module frame, which keeps the south edge of the module frame sufficiently high to not suffer shading from an adjacent ballast weight, such as a paver. In this disclosure, various embodiments are presented for enabling said elevating feature while retaining the full stackability of the overall module with integrated frame and installation system. In this description, south edge of the module describes the edge that, when the installation is carried out in the Northern hemisphere, is preferably oriented closest to the south. In general, when the module is tilted, it is the edge that is closer to the ground. In a landscape orientation installation, it is the longer edge of the module that is closer to the ground.

In addition, we teach the use of various connections to ensure solid connectivity along east-west direction, with east-west being the direction nomenclature for an array that is essentially south facing. The current disclosure demonstrates new concepts that provide significant new ideas and improvements for sound, reliable, yet flexible and easily installable connection along the east-west direction.

The mounting structures presented in here allow for flexibility with respect to the mode of installation, in accommodating for adhesive, ballasted and roof penetrated fixed connection to the roof.

The same concepts also allow for interconnection of adjacent solar modules, thereby increasing the tributary components of adjacent modules to resisting wind loads, which in turn qualifies the system to withstand higher wind loads. The mounting structure is shipped as integral with each module, yet it allows for attachment of adjacent modules. Connections are established to the modules to the East and to the West, as well as to the North and to the South. The presented configurations cause the entire module array to be positively interlocked mechanically for maximum structural resistance to withstand environmental loads.

In the various embodiments, we present mounting structures that are attached to the module with frame prior to installation, but with differences in the design and function of the mounting structure. These embodiments are based on a concept capable of working both with a molded frame as well as with a standard Al frame module, but from a cost point-of-view, molded frames are more readily capable of providing the disclosed features at lower cost. The embodiments consist of at least one structure that is tucked in, preferentially below the module and, upon installation can swing or slide out or be removed and reattached to lift up at least one side of the module, for instance the North side (on an installation in the Northern Hemisphere). Optionally, a similar structure can be attached to the South side (also for the example of installation in the Northern Hemisphere), preferably lifting up said module to a lower extent. Such additional lifting can be advised when a ballasted design is chosen which requires pavers or other weight carriers to be placed in such a way as to not cause additional shading issues to a module's Northern neighbor or neighbors.

Various embodiments for accomplishing said additional lifting of the second (typically southern) side, in a north-south oriented structure, are shown.

Said embodiments enable East-West connection between adjacent modules by an integrated panel that swings or slides out to enable connection to the neighbor module.

The use of polymer or fiber reinforced polymer material for the disclosed frames and mounting structure solutions eliminates the need for grounding. Such materials and their manufacturing using injection molding lend themselves for a cost-effective implementation of the features presented.

BRIEF DESCRIPTION OF THE DRAWINGS

The features, nature, and advantages of the disclosed subject matter may become more apparent from the detailed description set forth below when taken in conjunction with the drawings in which like reference numerals indicate like features. At times, a feature may have two reference numerals assigned to it. In general, this may indicate that the same feature is functionally in a different functional position or status, such as for instance folded in, unfolded, or in transition.

The drawings serve to explain the inventions disclosed herein. For simplicity, it is assumed that the installation is done in the Northern Hemisphere, with a North-South oriented exposure geometry. That means to express that panels are tilted typically with the Northern edge as high or higher than the southern edge; panel rows arranged East-West and subsequent rows arranged due North or due South. Naturally the same concepts hold as well for the Southern Hemisphere with arrangements adapted accordingly, and also hold for exposures that are not exactly in Due Southern centered exposure. All arrangement geometries are considered captured as part of this invention. Several of the embodiments demonstrated are also applicable to so-called East-West installations, wherein panels are typically oriented in a see-saw mode where adjacent modules are tilted alternatingly towards the east or towards the west. Such transferable concepts are intended to be captured in this disclosure as well.

FIG. 4A shows the elevation bar folded in, parallel to the mounting foot surface, for lowest profile during transport. FIG. 4B shows the elevation bar being tilted upward for installation. FIG. 4C shows the elevation bar extended vertically and snapped into place, and the northern neighbor panel engaged and connected to the mounting foot via the cutout in the extension bar and a hook on said northern neighbor panel.

FIGS. 4D-4H show different views of engaging a PV module with integrated mounting system to its south neighbor module. FIG. 4D and 4E show side views, of said PV module prior to and then being attached, respectively. FIG. 4F and 4G show the same situation as FIGS. 4D and 4E, but from a top view, while FIG. 4H shows said PV module fully rotated in place, installed and engaged to its south neighbor module.

FIG. 10 A shows the inside of the east-west connection panel, whereas FIG. 10B shows the outside and an east-west connection screw just prior to engagement.

FIG. 14A shows said connection bar prior to attachment. FIG. 14B shows said connection bar attached.

FIG. 15A shows the additional ballast tray. FIG. 15B shows said ballast tray installed. FIG. 15C shows northern neighbor module installed as well. FIG. 15D shows ballast pavers placed onto mount feet and onto said ballast tray.

FIG. 17A shows said wind deflectors prior to engagement. FIG. 17B shows said wind deflectors engaged.

FIG. 18B shows said wind deflectors prior to engagement. FIG. 18C shows said wind deflectors engaged.

FIG. 21A shows said PV module approaching its southern neighbor module. FIG. 21B shows said PV module being connected to said southern neighbor module. FIG. 21C shows a closeup of said PV module being connected to said southern neighbor module. FIGS. 21D and 21E show said PV module being rotated into an installed position and engaged and connected to its southern neighbor module.

FIGS. 22A and B show top views of a framed PV module with integrated mounting system engaged and installed in a connected way, with the help of wheels and connecting hooks. FIG. 22A shows two neighbor modules in closeup. FIG. 22B shows three attached and installed PV modules with integrated mounting systems.

FIG. 24A illustrates a PV module with components folded in for transportation and stacking. FIG. 24B illustrates a PV module with components rotated into installation positions and mount feet engaged. FIG. 24B shows pavers placed on said mount feet.

FIG. 25A shows said rotatable elevating bars with connecting hooks rotated in for transport and stacking. FIG. 25B shows said rotatable elevating bars with connecting hooks rotated into an installation position.

DETAILED DESCRIPTION

In the presented embodiments, depicted in FIGS. 1-25, the installation of and interconnection between modules is achieved in a way described in the following. The concepts have in common among other things that the support parts for the installation and racking are an integral part of the framed PV module during the transport and prior to installation at the designated installation site. They also have in common that they work for installations where mounting feet of such systems are attached via an adhesive on the bottom side of said mounting feet or via ballast to be place on top of said mounting feet, or, usually less desirable, by roof penetration, enabled by holes in said mounting feet through which fasteners can be applied.

Figure 1:
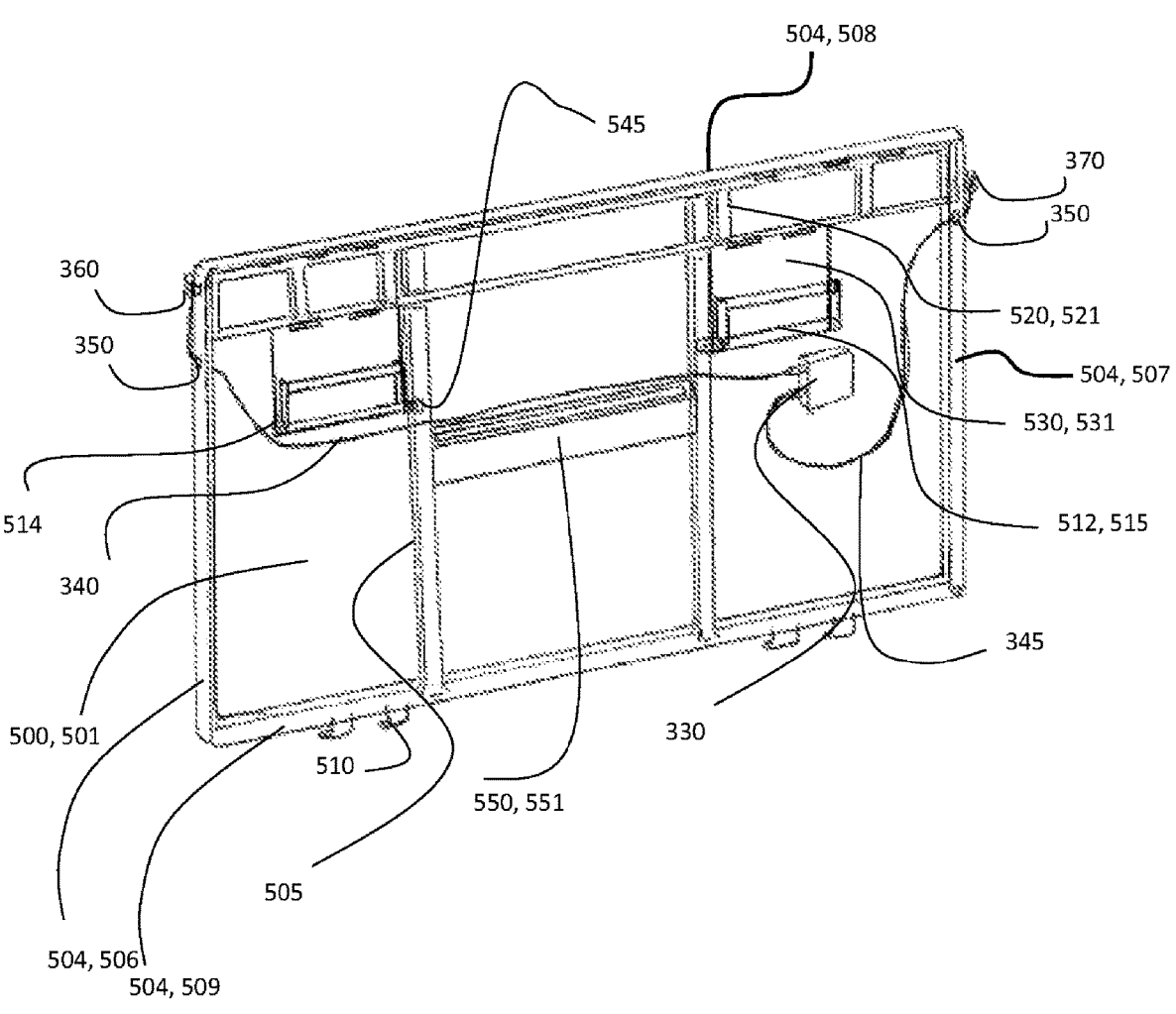
FIG. 1 shows the underside of a PV module with integrated mounting system, with mount feet containing elevating bars.

FIG. 1 shows the underside of a framed PV module with integrated mounting system 500, 501, with PV module frame 504 consisting at least of east frame edge 506, west frame edge 507, north frame edge 508 and south frame edge 509 and usually also having structural strength enhancing supporting cross bars 505. All attachments for mounting are folded in, for stacking and transportation. Illustrated here is a case where a relatively shallow angle of mounting is indicated by a not very tall northern frame mount 520, 521, which is folded in and by mount feet 530, 531, which are folded in and are nested inside the frame but extended by 180 degrees from the bottom of the frame mount 520, 521. Said mount feet also contain elevating bars 512, 515 that are folded in for stacking and transport. Said elevating bars can be folded out upon installation and rotated around hinges 514. Also shown are supporting cross bars 505 underneath the panel. Said supporting cross bars serve to latch the frame mount 520 and mount feet 530, the latter via snapping location 545 to the supporting cross bars for stacking and transport. Additionally, said supporting cross bars 505 also hold a folded-in snow mount 550, 551, which can also be used as a carrying handle for the panel. Also shown are junction box 330 and cabling with a first polarity cable 340 and a second polarity cable 345, which are each routed and fed through pass-through holes 350 in the frame, with connectors of first polarity 360 and second polarity 370 placed in suitable positions, in order to enable easy cable connection between adjacent panels. Also shown are connecting hooks 510 along the southern edge of the frame. Said front connecting hooks are to engage with openings

564 that are detailed in FIGS. 4A-H in elevating bars 512 of their southernmost neighbor module and provide a north to south module to module locking.

It needs to be noted that all embodiments presented in this disclosure lend themselves well to various means of securing to roof surfaces, namely adhesive, ballasted and fixation through roof penetration, even though the latter is generally not desired when not required. Adhesive attachment is readily realized on membrane roofs covered by for instance TPO or EPDM foils. In this mode, mount feet 530 can be equipped, preferably prior to shipment, with adhesive on the side that is facing the roof membrane surface, with a suitable adhesive where said adhesive is protected for stacking and shipping by a thin liner which is removed immediately prior to attachment to said roof membrane. Such thin liner serves as release liner. It is advantageous to purposely oversize said release liner compared to the dimension of the mount foot. Doing so allows the installer, even when wearing working gloves, to easily and quickly access the edge of the release liner for fast removal. Such oversizing is also done with respect to the adhesive itself, thereby preventing inadvertent transfer of adhesive from mount foot to the surface of the PV laminate of the next lower PV module in a stack, during storage and transportation.

For ballasted attachment, the same mount feet 530, and optional additional ballasting trays presented later herein are designed to receive pavers to weigh the system down. In that mode of attachment, it can be advantageous to prepare said underside of said mount feet 530 with a slip sheet or to retain an adhesive as used for adhesive attachment to a roof. By doing so, substantial cost savings can be realized compared to having larger fractions of the roof covered by slip sheet. Factory preparation, with potential for automation, is also capable of saving on labor costs associated with slip sheets.

For penetration attachment, it is advantageous if said mounting feet contain designated perforations to facilitate application of fasteners.

Figure 2:
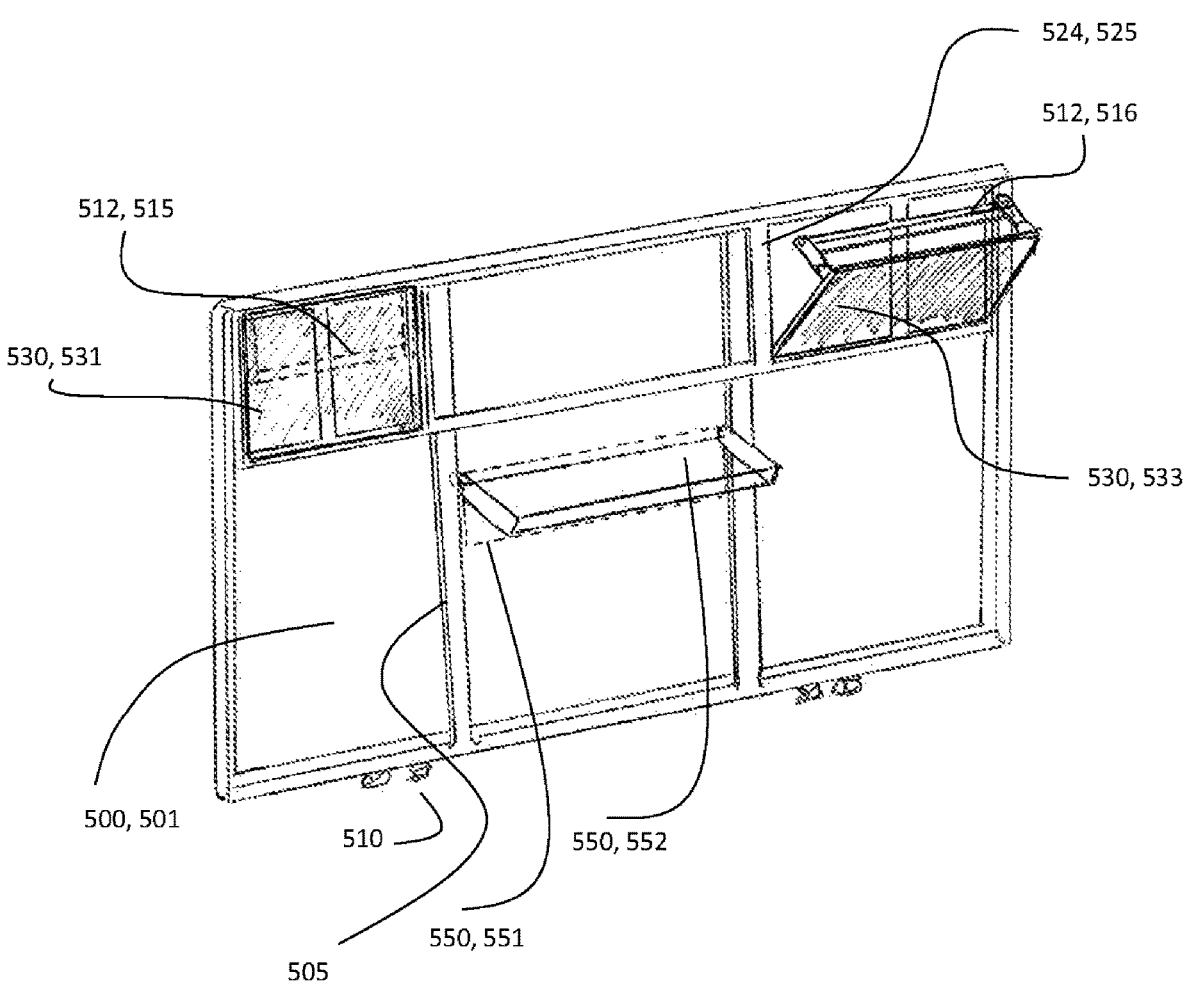
FIG. 2 shows the underside of a PV module with integrated mounting system. Said mounting system contains a northern mount support nested into the frame for transportation. Said northern mount support has a substantial height, allowing a relatively high tilt angle of the panel towards the sun, away from horizontal. Said substantial height allows for nesting the mounting feet within the mount support for transportation. Said mounting feet themselves contain an elevating bar which itself is nested within the mounting foot for stacking and transportation and is swiveled into place for installation.

FIG. 2 shows the underside of a framed PV module with integrated mounting system 500, 501. Said mounting system contains a northern mount support 524, 525 nested into the frame for transportation. Said northern mount support 524 has a substantial height, allowing a relatively high tilt angle of the panel towards the sun, away from horizontal when installed. Said substantial height allows for nesting the mount feet 530, 531 within the mount support for transportation. Said mount foot itself contains an elevation bar 512, 515 which itself is nested within the mounting foot for stacking and transportation, indicated in position 515 and is swiveled into place for installation, as indicated on one of the mount feet 530 that is partially folded out 533, and the elevating bar 512 is partially folded out 516 to indicate the process of installation.

In addition, the figure illustrates how a snow mount support 550 close to the center of the panel (or alternatively a plurality of snow mount supports placed strategically to give best support) is also tucked in for stacking and transportation, as indicated by dotted lines 551 and then swiveled out to engaged position 552 prior to installation. Said snow mount support can also be used as a handle for carrying the panel. The mounting frame also contains supporting cross bars 505 which support the panel underneath. Said snow mount support 550 is preferably attached to said cross bars, rather than directly to the back of the PV panel laminate. Also shown are connection hooks 510 along the southern edge of the PV module frame, which serve to engage with cutouts in the elevating bars of the mount feet of its southern neighbor module.

Figure 3A:
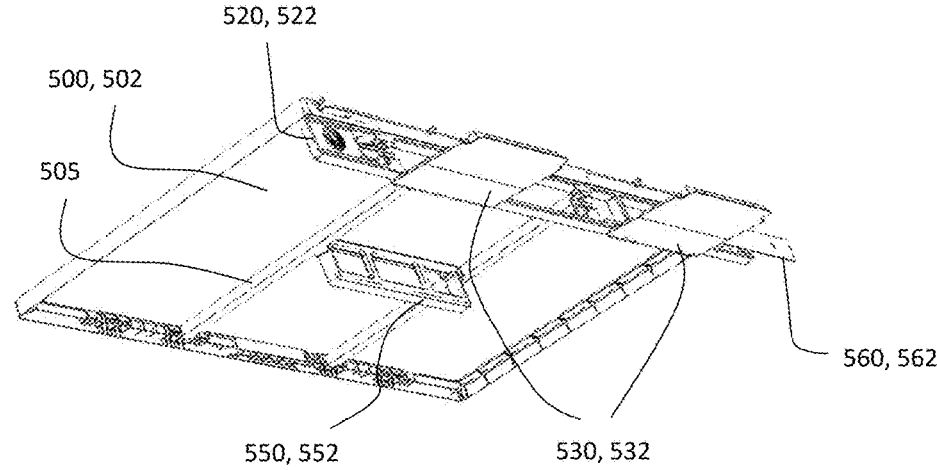
FIG. 3A and 3B show underside and top side, respectively, of a PV module with integrated mounting system. Supporting cross bars underneath the laminate are illustrated. A pivoting central snow mount to support high snow loads is also shown. Said central mount can also be used as a carrying handle when carrying a panel, for instance from a delivered stack to its final installation position. Also shown is the tilted out northern panel support mount, with mounting feet attached and hinged to it.

FIG. 3A shows the underside of a framed PV module 500, 502 with integrated mounting system, with the mounting components moved into installed position 502 for illustration. Supporting cross bars 505 underneath the laminate are illustrated. A pivoting central snow mount support 550, 552 to support high snow loads is also shown in its engaged location 552. Said central snow mount support can also be used as a carrying handle when carrying a panel, for instance from a delivered pallet stack to its final installation position. Also shown is the tilted out northern panel frame mount 520, 522, with mount feet 530 attached hinged to the bottom of the frame mount 520 and tilted out 532. Also shown is an east-west connection panel 560, 562 in a folded-out position. Said east-west connection panel and its functionality will be described further later in this disclosure.

Figure 3B:
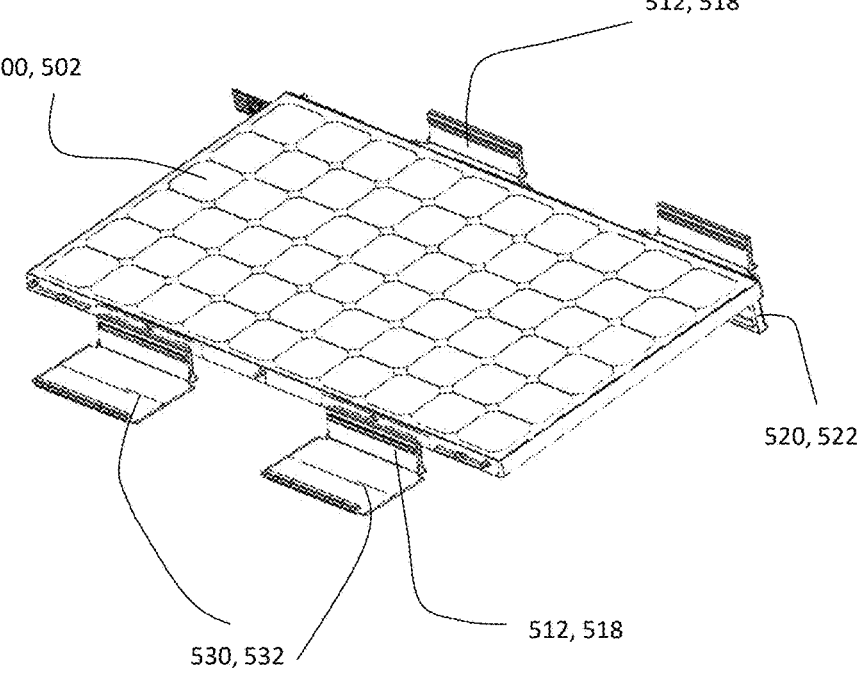

FIG. 3B shows a view from above of a framed PV module 500, 502 with integrated mounting system, with the mounting components moved into installed position 502 for illustration. Supporting cross bars 505 underneath the laminate are illustrated. A pivoting central snow mount support 550, 552 to support high snow loads is also shown in its engaged location 552. Said central snow mount support can also be used as a carrying handle when carrying a panel, for instance from a delivered pallet stack to its final installation position. Also shown is the tilted out northern panel frame mount 520, 522, with mount feet 530 attached hinged to the bottom of the frame mount 520 and tilted out 532. Mount feet of a southern neighbor PV module are also shown.

Figures 4A, 4B, 4C:
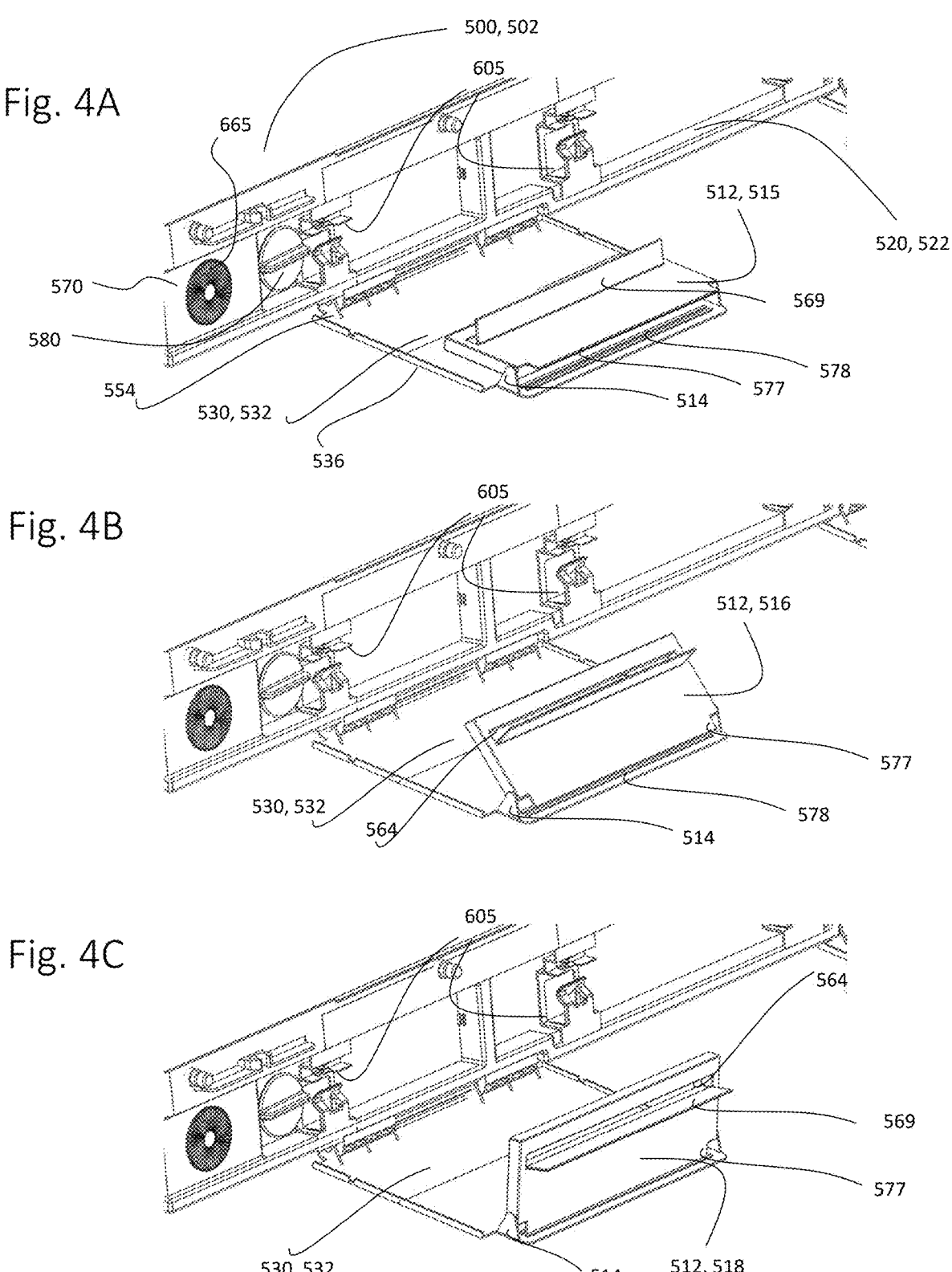
FIGS. 4A-4C show, an embodiment of a mount foot, containing a rotatable extension or elevating bar which allows connecting the southern edge of the northern adjacent panel at an elevated height, thereby preventing shading of the northern neighbor panel from pavers placed on the shown mounting foot.

FIG. 4A-4C show, in three images, an embodiment of a mount foot 530, containing a rotatable extension or elevating bar 512 which allows connecting the southern edge of the northern neighbor module 500, 501, with northern neighbor module not shown in this figure, at an elevated height, thereby preventing partial shading of the northern neighbor module from pavers placed on the shown mounting foot 530. The mounting foot ideally contains a ledge 536 along its edges that prevents pavers to be placed on top of mounting foot 530 from sliding off the mounting foot. FIG. 4A shows the elevating bar 512 folded in 515, parallel to the mounting foot surface, for lowest profile during transport. FIG. 4B shows the elevating bar 512, 516 being tilted upward 516 for installation. For that purpose, it is being rotated around hinge 514. FIG. 4C depicts the elevating bar 512, 518 extended vertically 518, preferably snapped into place using a ratcheted, flared or barbed feature for instance close to or associated with hinge point 514. FIGS. 4A-C show, as an example, a receptacle feature 578 in a mount foot with which a snapping lip 577 attached to the bottom of elevating bar 512 can engage, with the result of preventing collapsing of said elevating bar 512, 518, once it is rotated into place. Also shown is a support and guidance ledge 569 which is part of the elevating bar 512 and which will be further described in FIGS. 4D-4H.

FIGS. 4A-4C also depict cable management clips 605 that are part of frame mount 520. Such clips allow for clean and easily accessible fixation of cables between PV modules, including home runs. By placing the PV module cables into said clips, cabling is fit within the silhouette of the frame mounts. Cable routing from junction box to the east and west edges of the PV frame can be prepared at the factory. Cables can be prepared prior to shipment to be at the right location for easy connection during installation. Said cable management clips also serve to release strain of each cable by providing designated routing geometry.

FIGS. 4D-4H show the northern neighbor module 500, 501 as it is being engaged and connected to installed mount foot 530, 532 of its installed southern neighbor module 500, 502 via its south connecting hook 510 to the elevating bar 512, 518. Herein, the front connecting hook 510 along its southern edge is mated to the elevating bar 512, 518 via an opening 564 in said elevating bar 512, 518. The elevating bar additionally may have a support and guidance ledge 569, which serves to support a northern neighbor module while being engaged to said elevating bar and which also serves to guide connecting hooks 510 of a northern neighbor module through opening 564 for engagement. FIG. 4D shows a side view of the northern neighbor module 500, 501 as it is approaching installation position; FIG. 4E shows a side view of the connecting hook 510 being engaged with mount feet 530, 532 of installed southern neighbor module 500, 502. FIG. 4F shows the same situation as FIG. 4D but from a tilted top perspective; FIG. 4G shows the same situation as FIG. 4E but from a tilted top perspective; FIG. 4H shows the northern module 500, 502 engaged and folded into installation position 502.

Figure 5:
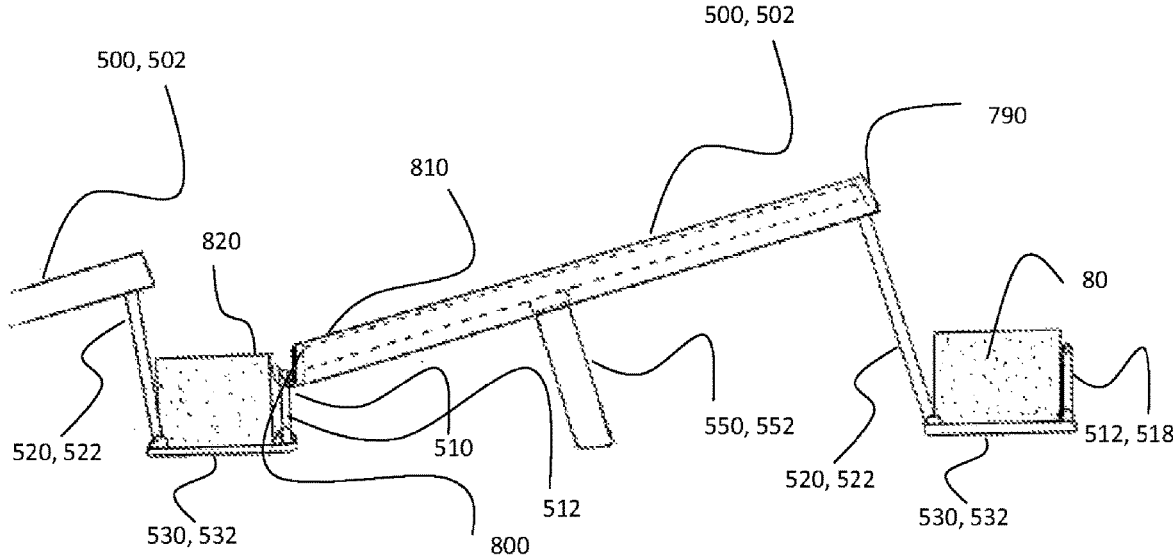
FIG. 5 shows a side view of an installed module with integrated mounting system, attached to a roof via ballast pavers that sit on mount feet, said mount feet having connecting elevating bars swiveled into place and neighbor module attached to said mounting foot via the connecting elevating bars. Said module also has a snow mount for snow load support attached to the back. This snow mount can be rotated into place for installation, while being tucked in within the module frame for stacking and transport.

FIG. 5 shows a side view of an installed framed PV module with integrated mounting system 500, with all components tilted out and engaged 502, supported on their northern edge by engaged frame mounts 520, 522 attached to a roof via ballast pavers 80 that sit on mount feet 530, 532, said mount feet 530 having connection elevating bars 512, 518 swiveled into place and neighbor module 500, 502 attached to said mounting foot via the elevating bar and front connecting hook 510 along the southern edge. Said module also has a snow mount 550 attached to the back and engaged into position 552. This snow mount can be rotated into place for installation, while being tucked in within the confines of the PV module frame for stacking and transport. The elevating bar 512, which is in its engaged position 518, enables lifting the southern edge of each module high enough to assure that the top edge 820 of ballasting paver 80 does not cause shading near the southern edge 810 of framed PV module 500. The northern edge 790 of the framed PV module 500, 502 is lifted up by the frame mount 520, 522, which is engaged and in place.

Figure 6A:
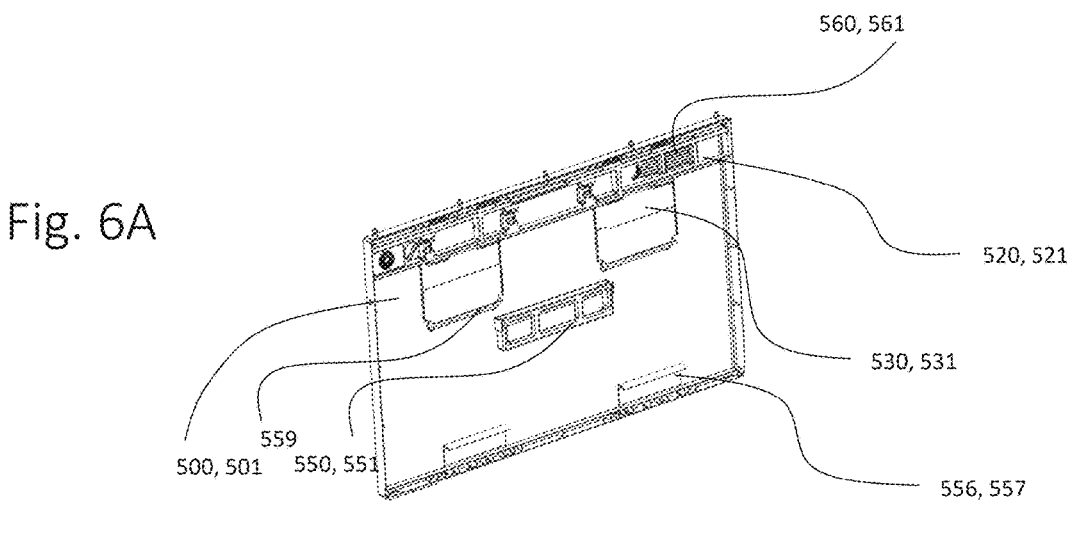
FIG. 6A and B shows the underside of a PV module with integrated mounting system. Illustrated here is the case of a lower mounting angle, and therefore a northern mount support which is not very high. In this embodiment, the mount feet are tucked in underneath the frame for stacking and transportation, but they are not nested within the northern frame mount. This figure also illustrates the embodiment where elevating bars along the southern edge of the module are rotated and tucked in inside the confines of the frame for stacking and transportation and are rotated out and in place for installation and attachment to the mounting feet of the southern neighbor panel.
Figure 6B:
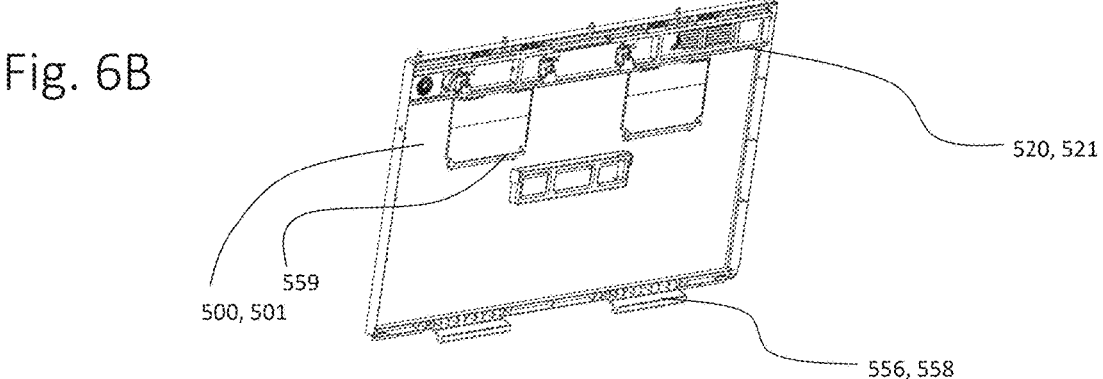
FIG. 6C shows the same module embodiment as 6A and 6B from above.
Figure 6C:
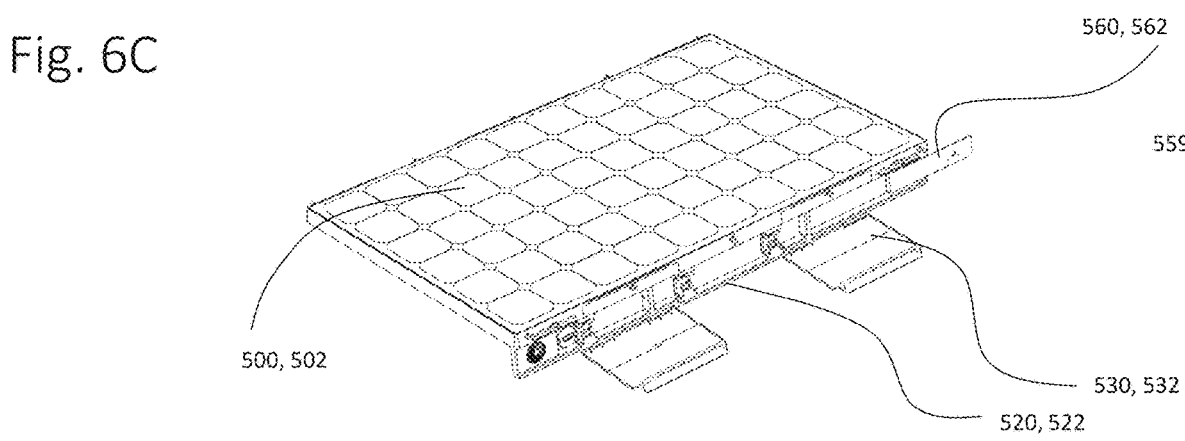

FIGS. 6A-C illustrate another embodiment of an elevating bar to lift the southern edge of a framed PV module. It shows the underside of a PV module 500, with integrated mounting system and with attachments folded in for stacking and transport 501. Illustrated here is the case of a relatively low mounting angle, and therefore a northern frame mount 520, 521 which is not very high. In this embodiment, the mount feet 530 are tucked in flush underneath the frame for stacking and transport 531, but they are not nested within the northern frame mount. FIG. 6A also illustrates the embodiment where elevating bars that include engaging hooks 556 along the southern edge of the module are rotated and tucked in inside the confines of the frame for stacking and transportation 557. FIG. 6B shows said elevating bars that include engaging hooks 556 rotated out and in place 558 for installation. Attachment of the module to its southern neighbor module is via that neighbor module's mount feet 530 by means of an engagement bar 559 which is part of mount feet 530. Also depicted in FIGS. 6A and 6B are east-west connection panels 560, 561, folded into frame mounts 520, 521 for transportation. FIG. 6C depicts a top view of said embodiment, with frame mount 520 rotated out and engaged 522, with mount feet 530, 532 rotated out and engaged 532 and with east-west connection panel 560, 562 folded out and engaged, the latter for illustration purposes.

Figure 7:
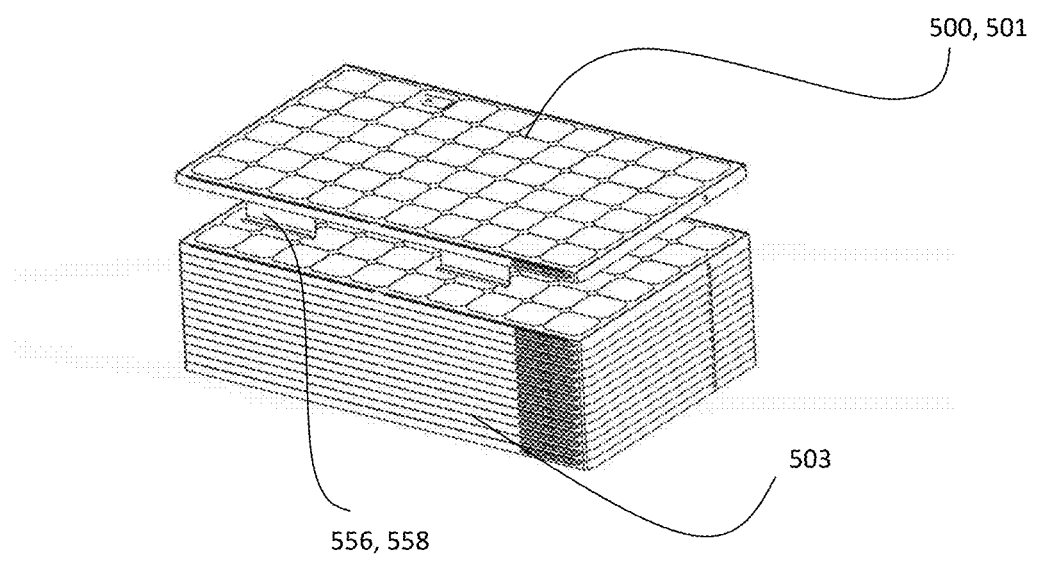
FIG. 7 illustrates the tight stacking of PV modules with integrated mounting systems where the southern elevation bar and contact is tucked in for stacking and transport and tilted out prior to installation.

FIG. 7 illustrates the tight stacking of PV modules with integrated mounting systems 500, 501, which are arranged in a stack 503 and where the southern elevating bar with engaging hooks 556 is tucked in for PV modules 500 in the stack 503, whereas for the top module 500, 501, said rotating elevating bars with engaging hooks 556, 558 are rotated out prior to installation, as illustrated by position 558.

Figure 8:
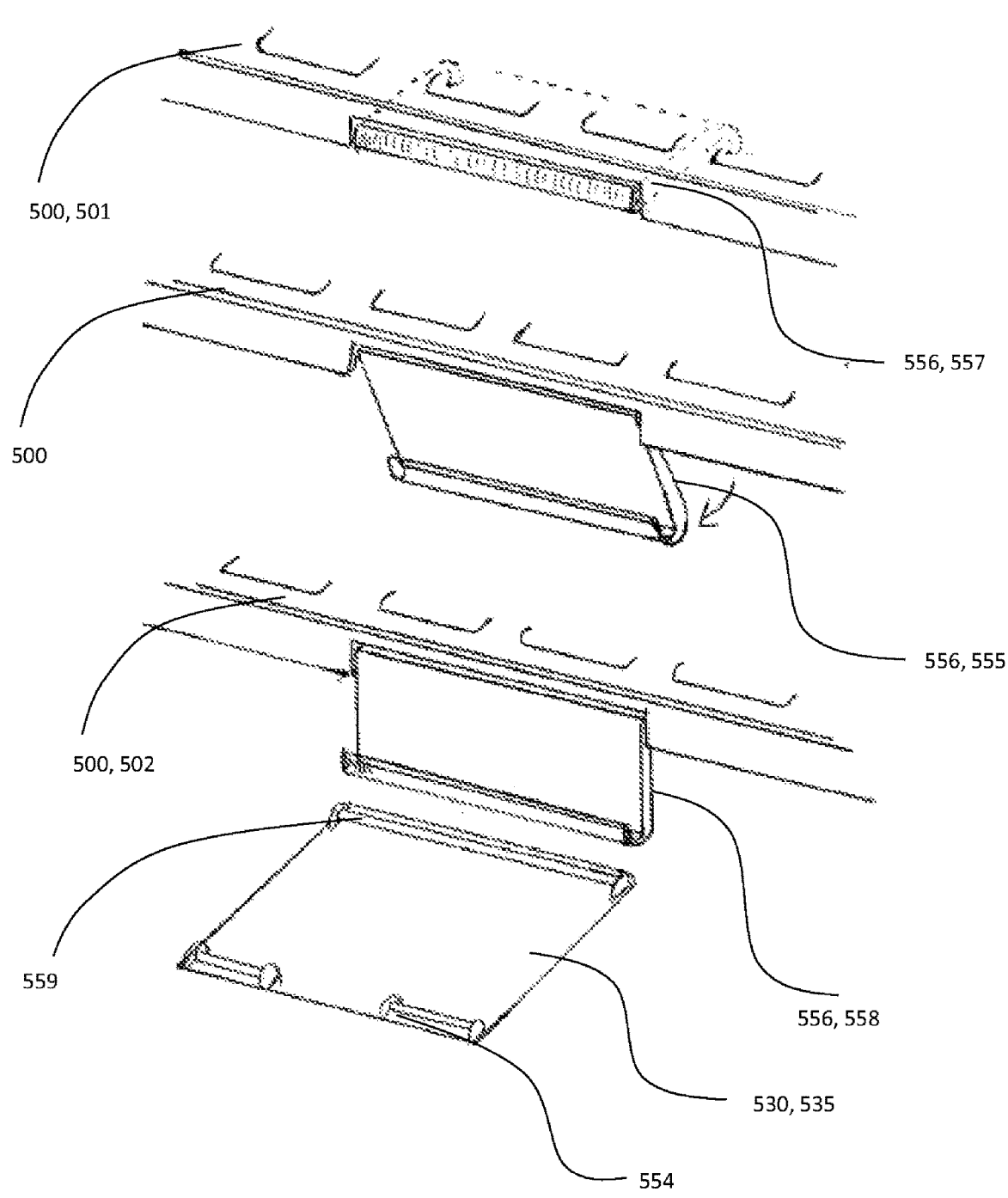
FIG. 8 consists of three images and shows a mechanism where an elevating bar with south connecting hook that is to elevate the southern edge of the panel is tucked or nested into the frame for stacking and transport (first image at the top), and then swung out for installation (second image in the middle). The third image (at the bottom) shows the connection extension securely in place. Preferably the elevating bar with south connecting hook directly snaps into place when swiveled out to approximately 90 degrees or engages with a separate snapping mechanism that prevents it from folding back in inadvertently. Also shown is the mount foot from the adjacent module to the south.

FIG. 8 shows in more detail the engagement and elevating bar mechanism introduced in FIG. 6. FIG. 8 consists of three images of framed PV modules with integrated mounting systems 500, 501 and shows a mechanism where the south connection extension that is to elevate the southern edge of the module, namely the elevating bar 556, is tucked or nested into the frame for stacking and transport 556, 557 (top image with dotted lines visualizing the folded in elevating bar with connecting hook), and then swung out for installation 556, 555 (middle image). The bottom image shows the elevating bar 556 securely in place 558. Preferably the elevating bar snaps in place when rotated out to approximately 90 degrees. Such snapping and locking in place can be accomplished by the use of a customary barbed or flared feature. Also shown is the mount foot 530, for illustration purposed detached 535 from the adjacent module to the south, which is not shown. Connecting bars 554 show the connecting point between mount feet and frame mount of said adjacent module.

Figure 9:
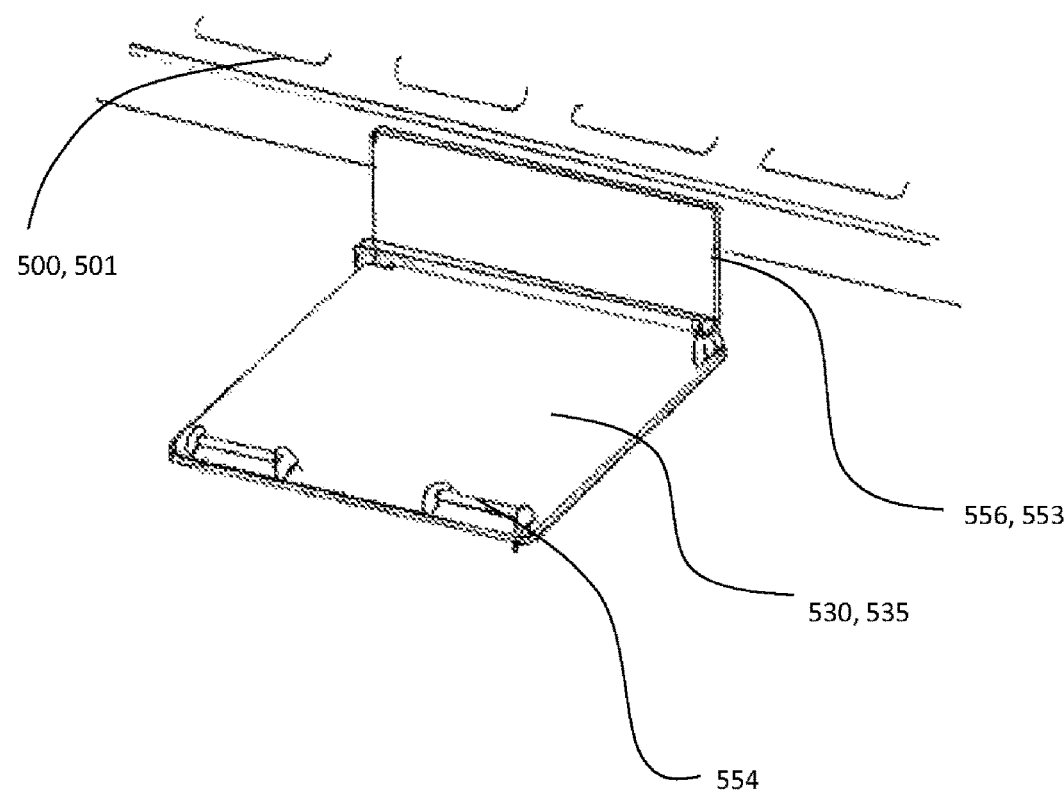
FIG. 9 shows the elevating bar solidly in place. Said connection extension can also be snapped in place or be solidly attached to the southern edge of the panel frame. However, this requires additional precautions when shipping, especially for the lowest panel on a pallet.

FIG. 9 shows a framed PV module with integrated racking system 500, 501, with the connection extension, the elevation bar with south hook 556, solidly in place and attached fixed 553 to the southern edge of said framed PV module. Said connection extension can also be snapped in place or be solidly attached to the southern edge of the panel frame. It attaches to mount foot 530 of the southern neighbor panel. However, having said elevating bar as a fixed part of the PV module frame requires additional precautions when shipping, especially for the lowest panel on a pallet. Preferably, the elevating bar is to be flared out slightly but enough to enable dense stacking.

Figures 10A, 10B:
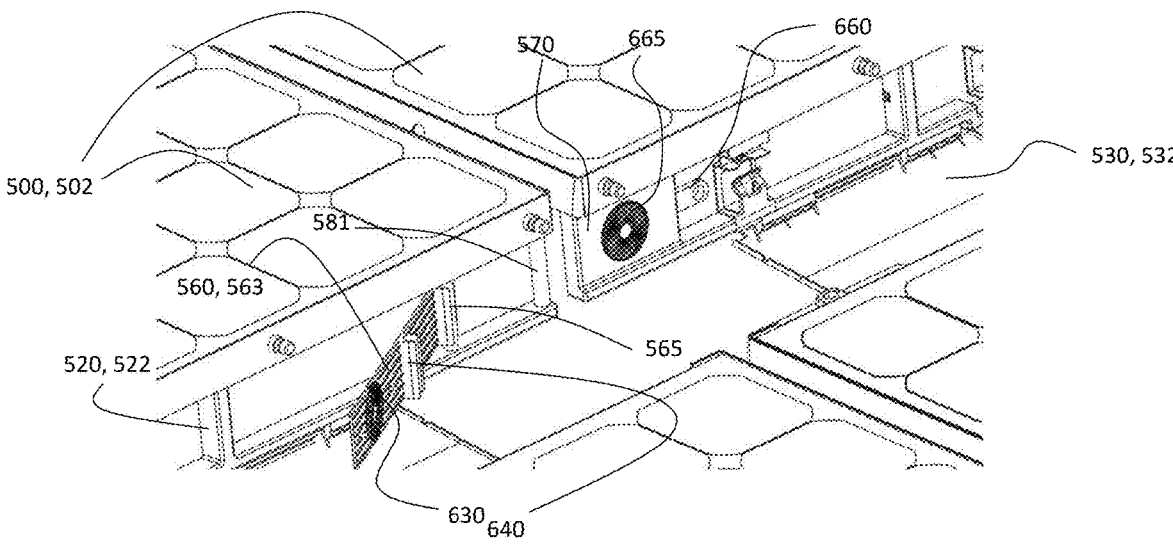
FIG. 10A and 10B show framed PV modules with integrated mounting systems with an east-west connection that is established via a rotatable east-west connection panel and matching serrated features on the swing latch of the east-west connection panel and the frame mount of the neighbor module.

FIGS. 10A and 10B shows framed PV modules with integrated racking systems installed 500, 502, with frame mount 520 folded out and engaged 522 and with mount feet 530 folded out and engaged 532. The two southern depicted framed PV modules are east and west neighbor of each other. Also shown here is an east-west connection mechanism that is also integrated into the system. The east-west connection between the modules is established via a swing latch mechanism consisting of an east-west connection panel 560, which has a stabile hinged connection 565 to the frame mount and which, as part of installation, is being swung into position in this schematic 563 and which has a serrated feature 630 on the east-west connection panel and a mating serrated feature 665 in the east-west connection recipient location 570 on the frame mount of the neighbor module. Said serrated fixtures can be engaged under various angles and help overcome uneven roof installation situations. The rotatable east-west connection panel of one framed PV module with integrated mounting system is securely attached to the neighbor PV system by an east-west connection panel screw 580 that can be part of the frame mount 520 during transport and prior to installation 522. Said screw can be attached to said frame mount for instance in screw holding position 660. The serrated features 630 and 665 allow for secure and defined attachment and locking on uneven roofs, while the stabile hinged connection 565 of the east-west connection panel enables having the system as an integral part of the frame mount and thus of the framed PV module with integrated mounting system. As the east-west connection panel is closed for latching, stabilizing groove 640 of east-west connection panel is engaged to frame mount corner post 581. FIG. 10B illustrates east-west connection panel screw 590 just prior to being engaged.

Figure 11:
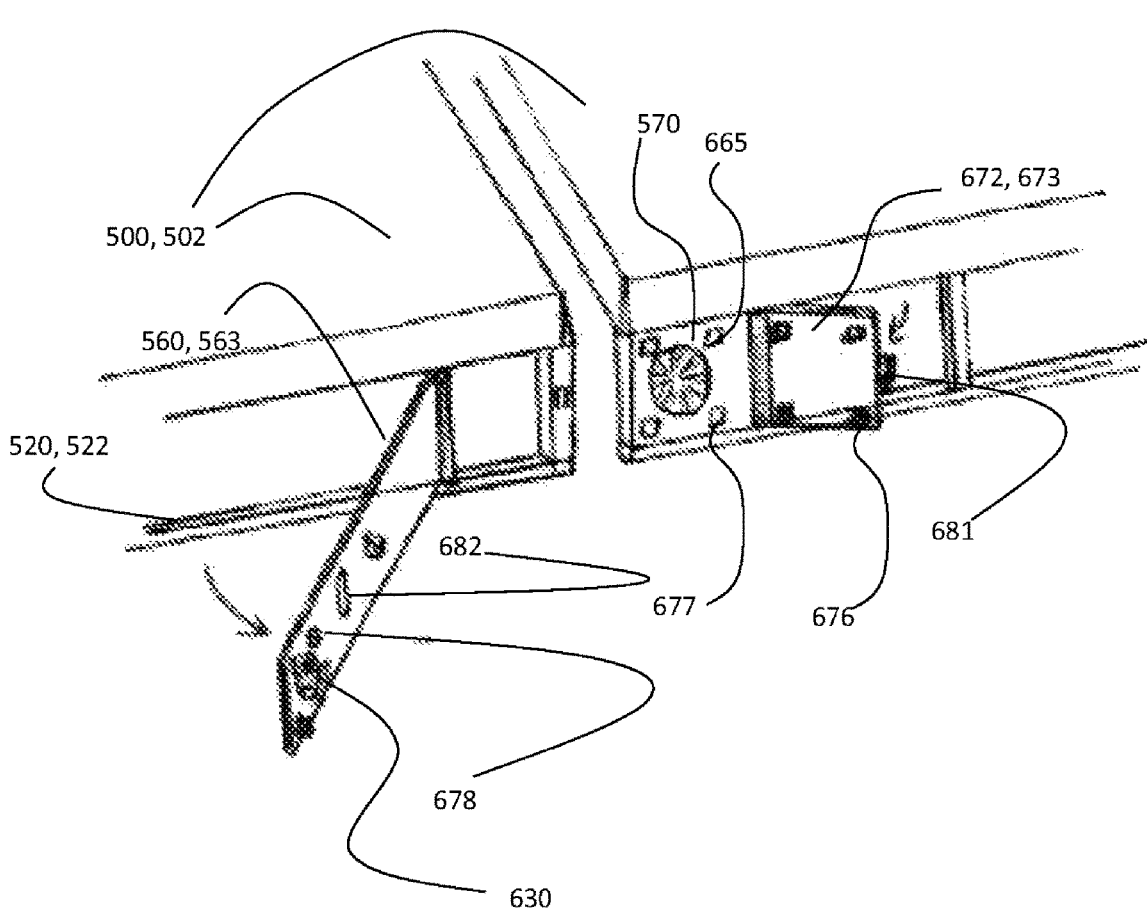
FIG. 11 shows an alternative attachment mechanism for the rotatable east-west connection panel. The east-west connection panel with embedded serrated feature is held down by a complementing rotatable locking latch on the neighbor module. This removes the need for a screw to be attached. This figure shows the attachment features in partially open positions.

FIG. 11 shows an alternative attachment mechanism for the rotatable east-west connection panel, which does not require an east-west connection panel screw. Framed PV modules with integrated mounting systems 500 in engaged position 502, with engaged frame mounts 520, 522 are illustrated. In this illustration, the east-west connection panel 560 with embedded serrated feature 630 is to be held down by a complementing locking latch 672 on the neighbor panel, here shown as partially swung out 673. This removes the need for a screw to be attached. Said complementing locking latch contains locking pins 676 which can optionally be braided or barbed, and which engage with locking pin holes 677 in the east-west connection recipient location 570, which also contains the mating serrated feature 665. Also shown is a locking latch snap fixture 681 which has a corresponding position 682 in the east-west connection panel 560. Said east-west connection panel 560 contains through-holes 678 which are large enough to permit locking pins 676 to pass through the east-west connection panel and fit into locking pin holes 677. This figure shows the attachment mechanism in an open position.

Figure 12:
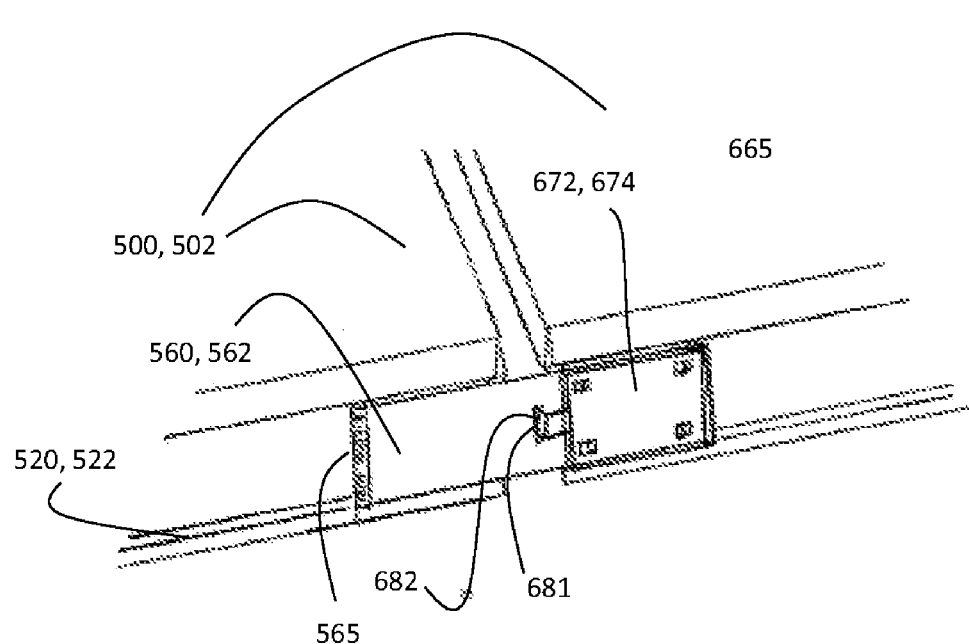
FIG. 12 shows the alternative attachment mechanism in a closed position.

FIG. 12 shows the alternative attachment mechanism of the previous figure in a closed position with the locking latch 672 in locked position 674 and east-west connection panel 560 securely locked in place 562.

Figure 13:
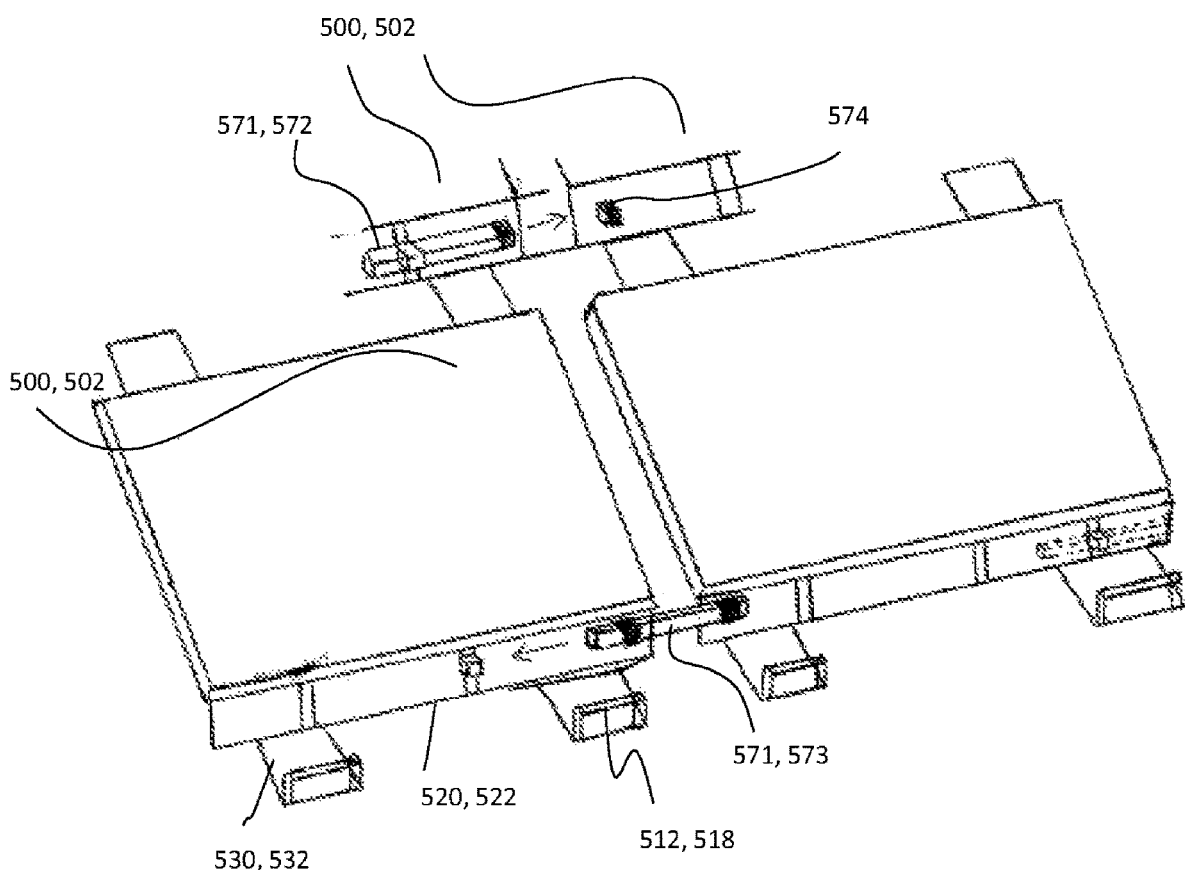
FIG. 13 shows an embodiment for an east-west connection along the north edges of an array with north south arranged solar panels. Said east-west connection is established by a sliding connection bar that resides, for transportation and stacking, within the north frame mount and is extended sideways upon installation and thus connected from a module on the east to a neighbor module to the west or vice versa. Said sliding connection bar can be positioned in place by snapping or by using a barbed snap or also by a serrated fixture as described before.

FIG. 13 shows another embodiment for an east-west connection between framed PV modules with integrated mounting systems 500 that are in engaged position 502, wherein said east-west connection is illustrated along the north edges of an array with north south arranged solar panels. Said east-west connection is established by a slidable connection bar 571 that resides, for transportation and stacking, within the north frame mount in position 572 and is extended sideways upon installation 573 and thus connected from a module on the east to a neighbor module to the west or vice versa. Said slidable connection bar can be positioned in place by snapping or a barbed snap to a locking feature 574 on the neighbor module. Also illustrated are the engaged PV frame mounts 520, 522 and engaged mount feet 530, 532, with engaged elevating bars 512, 518.

Figure 14A:
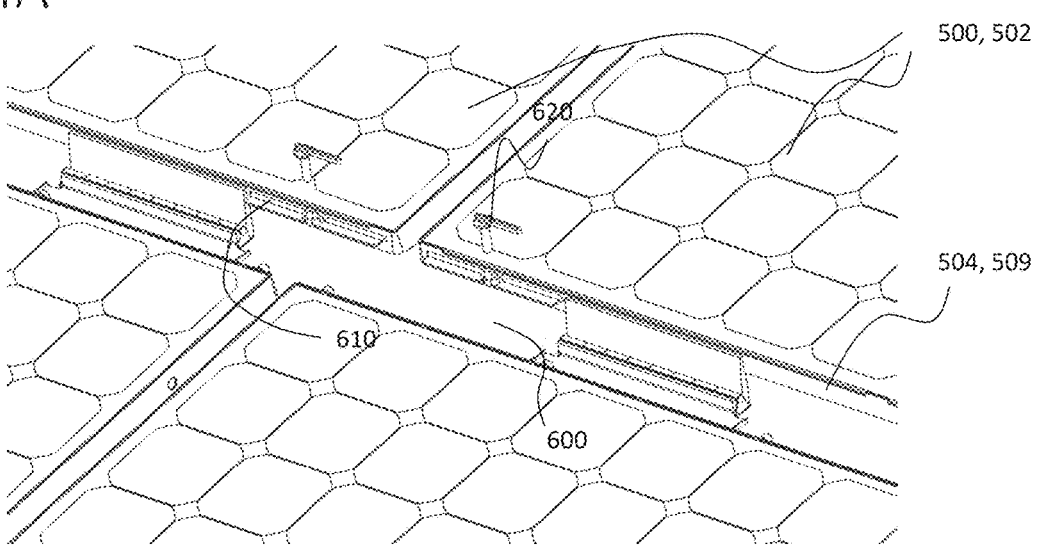
FIG. 14A and 14B show an east-west connection along the south edges of an array with north-south arranged solar modules. Said east west connection is established by a south edge east-west connection bar with perforations.
Figure 14B:
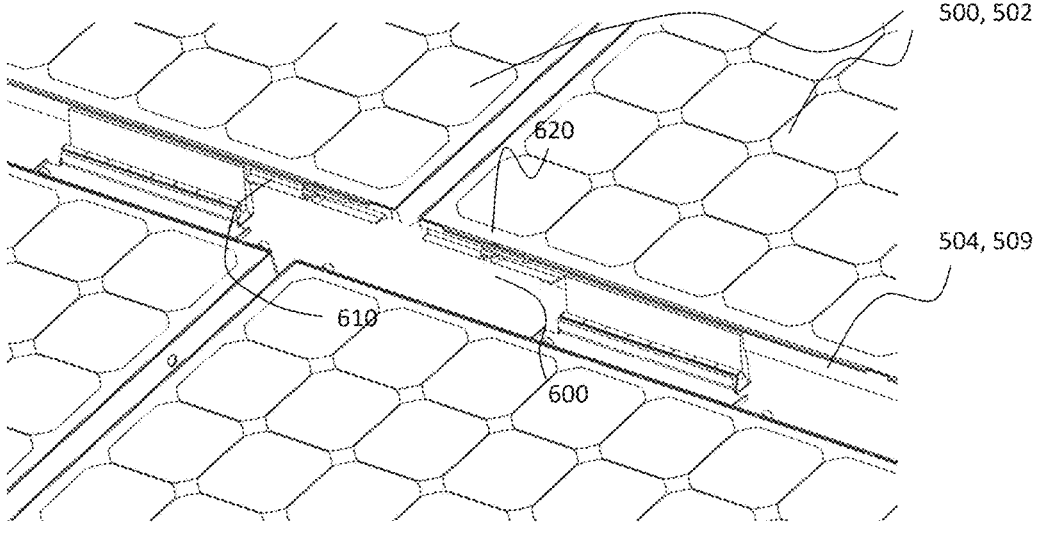

FIGS. 14A and 14B show framed PV modules with integrated mounting systems engaged 500, 502, and an alternate or additional east-west connection along the south edges of an array with north-south arranged solar modules. Said alternate or additional east west connection is established by a south edge east-west connection bar 600 with perforations, said perforations mated to south edge connection bar fixtures 610 protruding from the south edge of the PV module frame 504, 509. Said connection bar is tightened down screws 620, preferably thumbscrews which do not require tools. FIG. 14A shows the structure not engaged, whereas FIG. 14B shows it engaged, with screws 620 tightened.

Figure 15A:
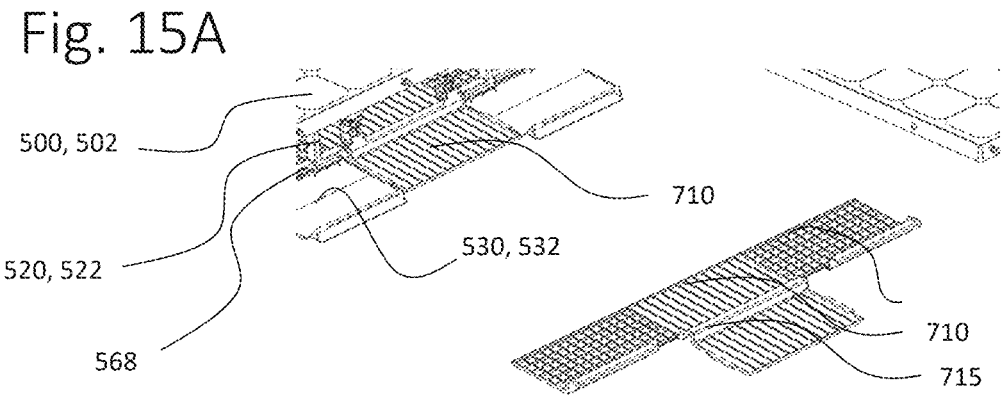
FIGS. 15A-15D show framed PV modules with integrated mounting system and with additional ballast trays that can receive more pavers than fit onto the two mount feet. Such ballast trays can be put in place for instance at high wind load points such as the outermost corner modules of an array. Said ballast trays hold down the panels via engaging with and holding down the lower support bar of the northern mounting support.
Figure 15B:
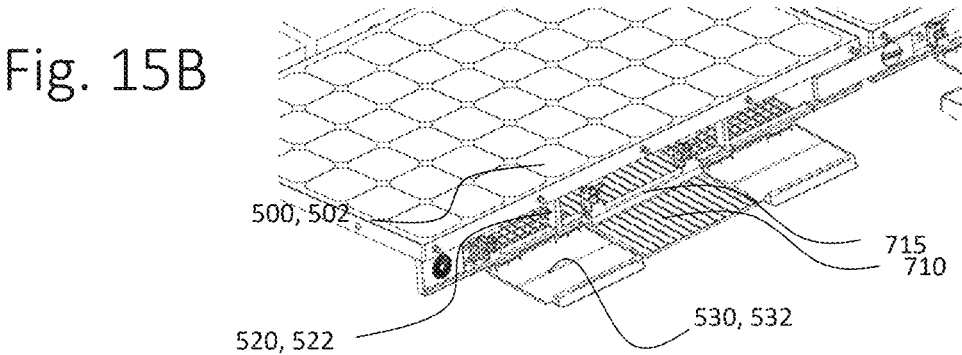
Figure 15C:
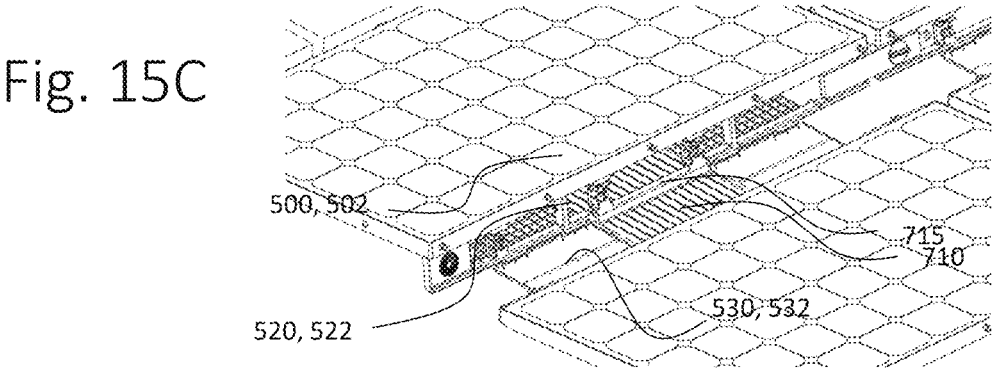
Figure 15D:
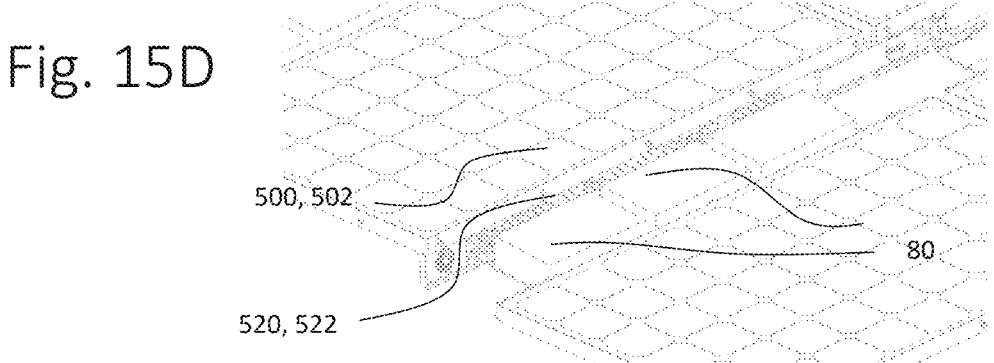

FIG. 15A-D shows framed PV modules with integrated mounting systems engaged 500, 502, with engaged frame mount 520, 522 and additional ballast trays 710 that can receive more pavers than fit onto the two engaged mount feet 530, 532. Such ballast trays can be put in place for instance at high wind load points such as the outermost corner modules of an array. Said ballast tray contains a ballast tray bridge 715 which serves to hold down the modules via engaging with and holding down the lower support bar 568 of the northern frame mount 520, 522. FIG. 15A shows ballast tray 710 separated, FIG. 15B shows ballast tray engaged to PV module 500, 502, and shows mount feet 520, 532; FIG. 15C shows the northern neighbor module and FIG. 15D shows pavers placed on mount feet 530, 532 and on ballast tray 710.

Ballast tray 710 may extend underneath the PV module, with easy placement access for pavers through an opening in frame mount 520, 522, thereby allowing the placement of additional pavers underneath the PV module, without requiring larger footprint on the roof.

Figure 16:
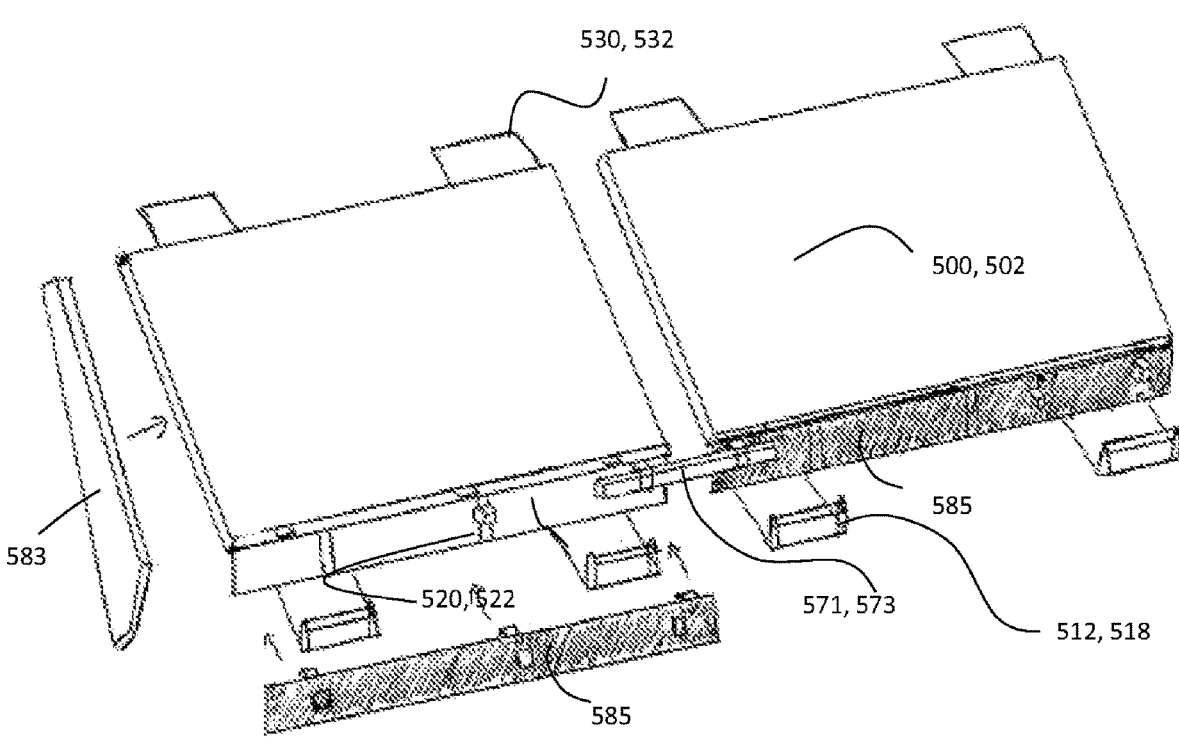
FIG. 16 illustrates the attachment of a wind deflector panel to the east edge of an array, as well as two wind deflector panels mounted to the northern frame mounts of modules. Said wind deflector panels are snapped into place above the east-west connections, which are, in this embodiment, established using the sliding connection bars introduced in FIG. 13.

FIG. 16 illustrates the attachment of wind deflector panels 585 to the north and side wind and fire guard 583 to the east edge of an array of framed PV modules with integrated mounting systems 500 with mounting systems engaged 502. Said north edge wind deflector panels 585 are in this embodiment snapped into place above the engaged east-west connections, which are, in this embodiment, established using the connection bars 571, 573.

Figure 17A:
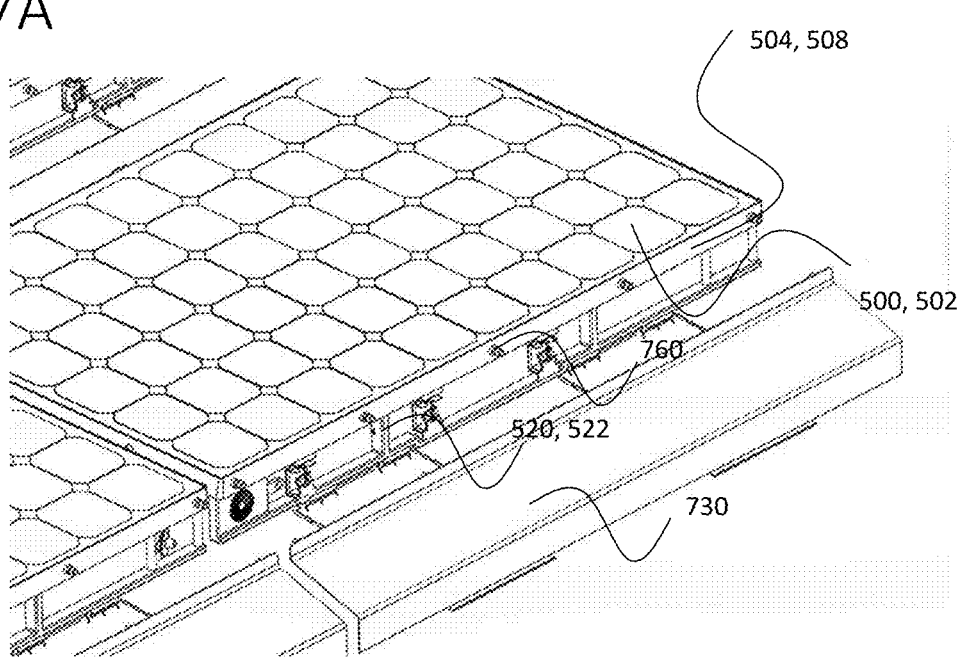
FIGS. 17A and 17B show wind deflectors along the northern edge of an array of solar modules with integrated mounting systems, where said wind deflectors can also cover pavers that can be placed on the northernmost mounting feet of said array.
Figure 17B:
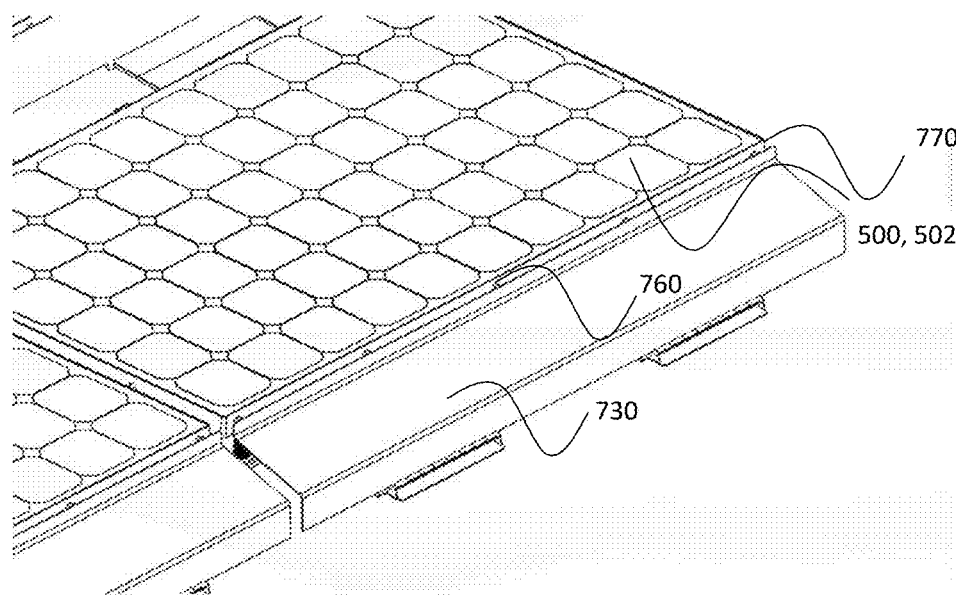

FIGS. 17A and 17B show array-edge wind deflectors 730 along the northern edge of an array of solar modules with integrated mounting systems 500, 502, where said array-edge wind deflectors also cover pavers that can be placed on the northernmost mount feet 530, 532 of said array. These north edge wind deflectors are more elaborate than north edge wind deflectors in other areas of an array of PV panels, since the elevated northern edge of an interlocked PV array is geometrically most exposed to wind attack The presented wind deflectors 730 are engaged to PV module frame via snapping pins 760 which serve to snap said wind deflectors in place, while retaining a gap 770 between wind deflector 730 and PV module north frame edge 504, 508, for better pressure equalization and lower uplift under wind load. FIG. 17A shows said array-edge wind deflectors 730 just prior to engagement, whereas FIG. 17B shows them engaged.

Figure 18A:
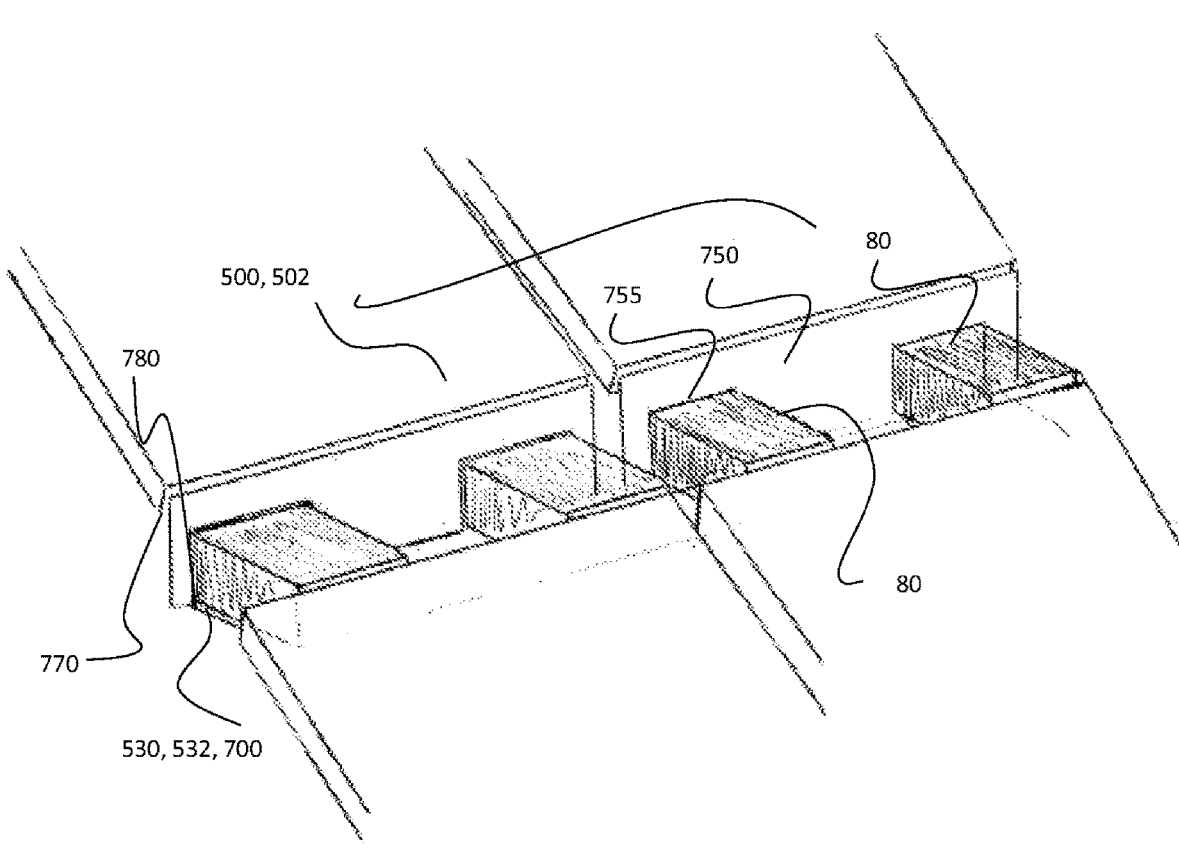
FIG. 18A illustrates wind deflectors that contain cutouts such as to easily accommodate the presence of pavers, especially for designs where pavers extend partially underneath the northern edge of the southern module.

FIG. 18A illustrates wind deflectors 750 along the north edge of framed PV systems with integrated mounting systems 500, 502; said deflectors 750 containing cutouts 755 such as to easily accommodate the presence of pavers 80, especially for designs where pavers extend partially underneath the northern edge of the southern panel. Engaged mounting feet 530, 532 can preferably contain lips to confine pavers and cutouts 700 in said lips, to confine said wind deflector shields 750. Wind deflectors themselves may contain lips 780 to fit in said cutouts 700. A gap 770 between wind deflector and the northern edge of the panels 500 can help reduce wind lifting force.

Figure 18B:
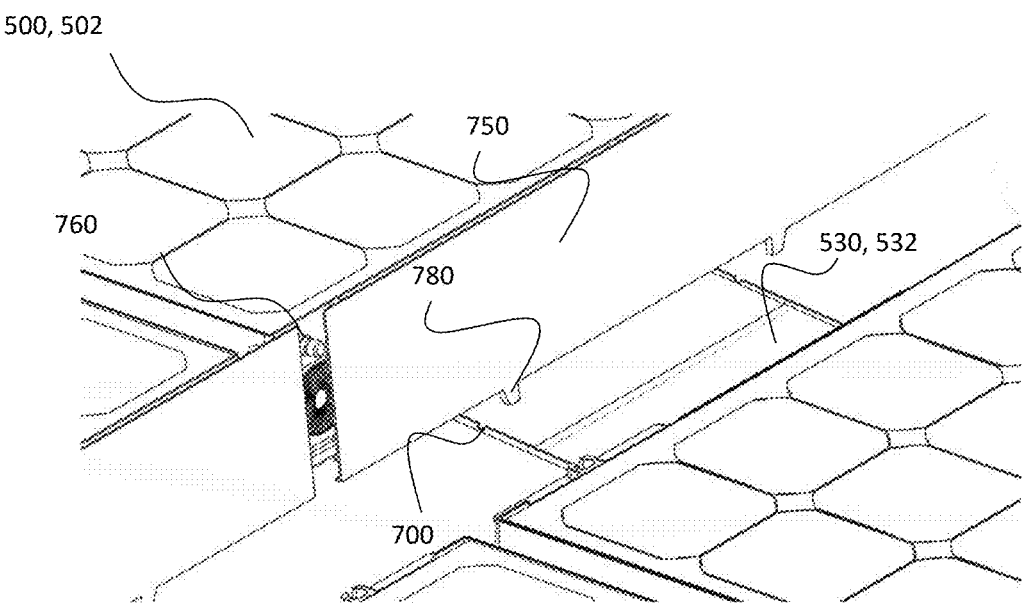
FIGS. 18B and 18C illustrate wind deflectors without cutouts.
Figure 18C:
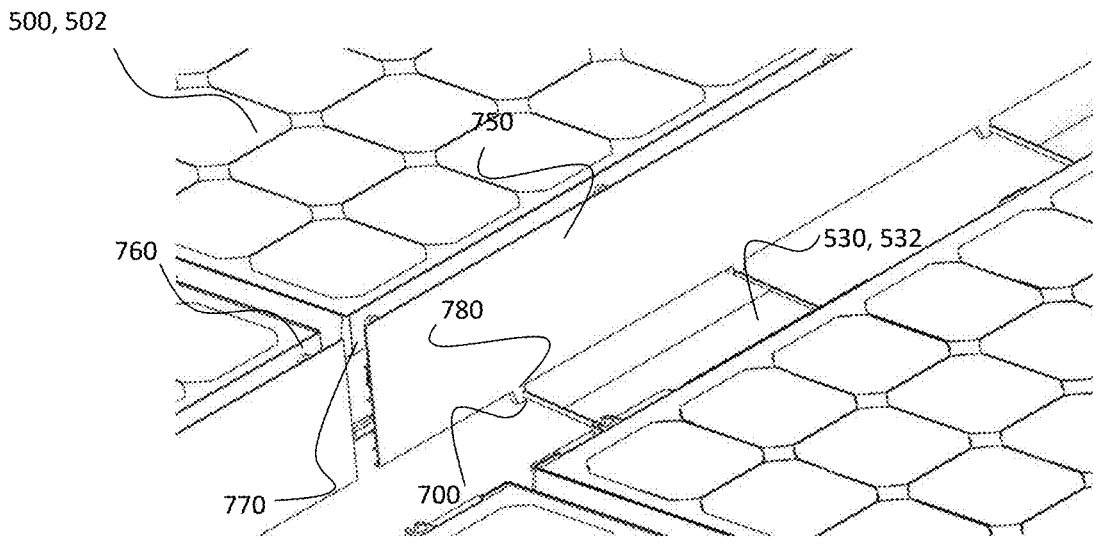

FIGS. 18B and 18C illustrate a wind deflector 750 without cutouts for pavers. FIG. 18B shows the wind deflector prior to being engaged, while FIG. 18C shows said wind deflector engaged. Also illustrated are pins 760 to snap the wind deflector in place, the gap 770 between wind deflector 750 and the north PV module frame edge 504, 508. Also shown is a cutout 700 in mount foot 530, 532 and lip 780 in wind deflector 750, wherein said lip in said wind deflector is engaged with cutout 700 and thus secures the position of said wind deflector 750.

The displayed optional placeable and removable wind deflectors allow for easy service access where needed. Additionally, deflectors can be omitted where not required.

The following FIGS. 19-22 illustrate an embodiment that can be added to all previously described embodiments. The addition of wheels or spheres to at least one edge of a module is presented which can enable a significant positive effect on the ergonomics of installation of said PV modules with integrated mounting systems. Especially with the background of having a single person manage the installation of large PV panels, such as those with 60, 72 or more solar cells of 156 mm or larger side lengths.

Figure 19:
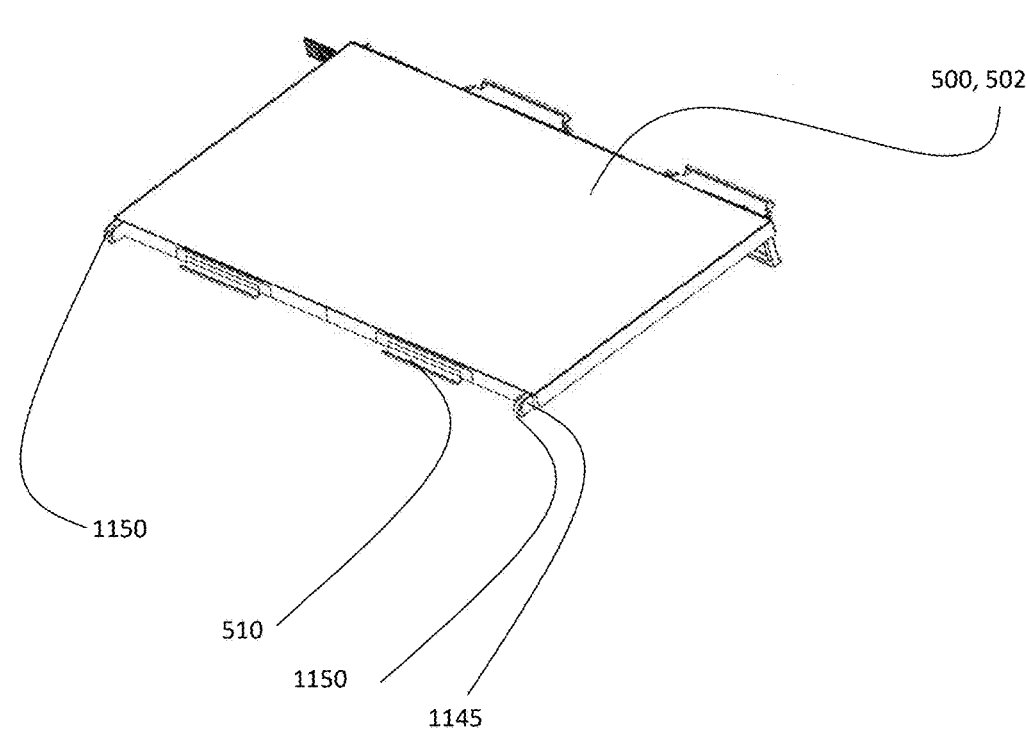
FIG. 19 shows a framed PV module with integrated mounting system which contains wheels or spheres along at least one edge in order to facilitate ergonomic movement assistance during installation.

FIG. 19 shows a framed PV module with integrated mounting system 500 with attachments folded in 501. Attached to the frames are wheels or spheres 1150 along at least one frame edge, in order to facilitate ergonomic transportation movement assist during installation. Wheels or spheres 1150 are attached to PV module frame via wheel receptacles 1145, which are part of the PV module frame edge, preferably along the south edge where the south edge connecting hooks 510 are located, such as to also facilitate guiding hooks into their position when installing. The wheels may be partially recessed into the frame, such as to not substantially increase the outside dimension of the PV modules with integrated mounting systems beyond the confines of their frame. Wheels depicted in the figures in this disclosure are shown as placed close to the corner of the frame edge, typically the south edge of the frame. However, it is also conceived that wheels are placed away from the corners and closer to the center of the edge, thereby allowing the user a higher clearance tolerance for uneven roofs, even with outer wheel contour being only a small amount larger than the outer contour of the connecting hook.

Figure 20:
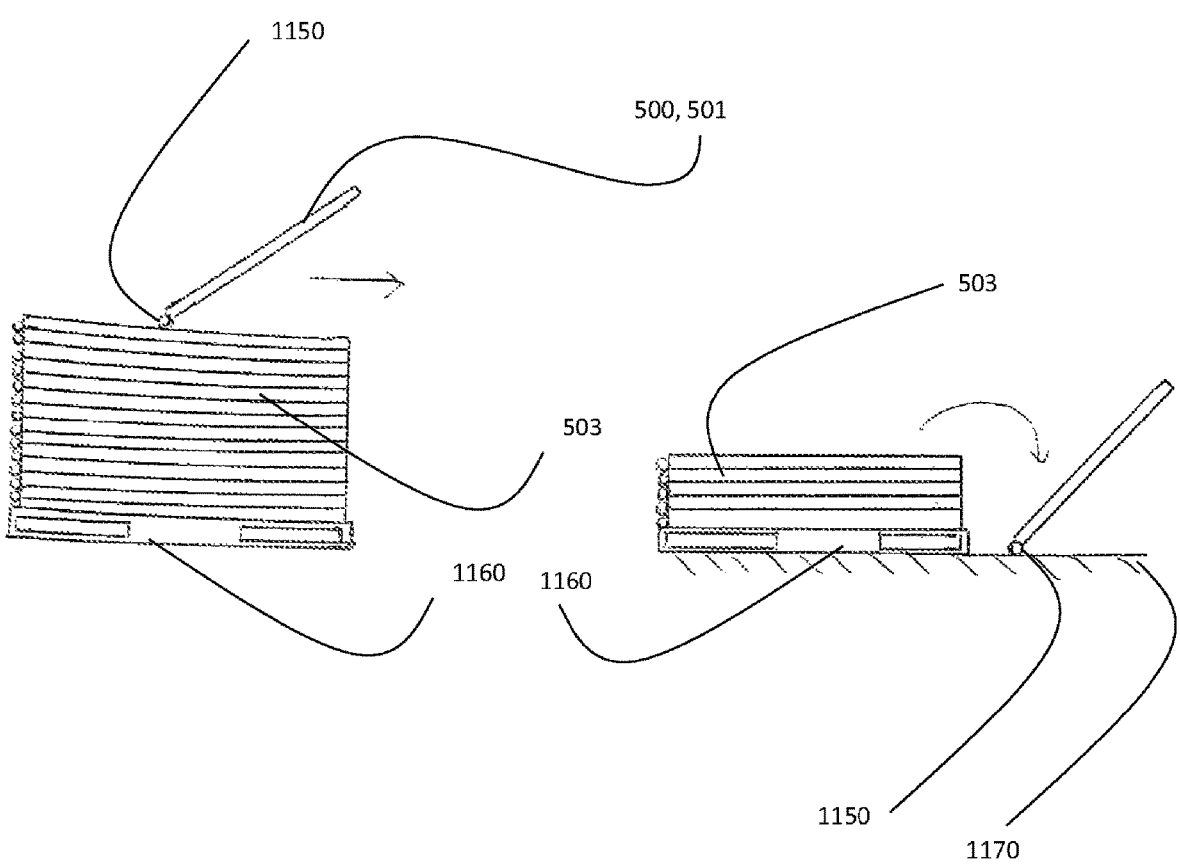
FIG. 20 shows a pallet stack of framed PV modules with integrated mounting systems and the top module being removed from said stack by partial lifting and then rolling across the surface or edge of its lower neighbor stacked module. Also shown is lifting the module down from the stack and onto the installation roof.

FIG. 20 shows a pallet 1160 and stack 503 of framed PV modules with integrated mounting systems 500, 501 where the top module is being removed from said stack by partial lifting and then rolling across the surface or edge of its lower neighbor stacked module using wheels or spheres 1150 attached to one edge of said modules. Also shown is one module lifted down from the stack and onto the installation roof surface 1170.

FIGS. 21A-21E illustrate installation steps of PV modules utilizing the help of wheels 1150 attached to said PV modules. Shown are side views of the edge of a framed PV module with integrated mounting system 500, 501 with connecting hook 510 and wheel or sphere 1150. Said wheel or sphere can also be used to facilitate easy alignment during installation onto the mounting foot 530, 532 of the neighboring module. For smoothest installation performance, the edges of wheel 1150 should extend beyond the edge of connecting hook 510 by about the same distance as the thickness of mount foot 530, 532. By doing so, the contact of the wheel to the roof surface allows for wheeling in connecting hook 510 towards engagement bar 559 which is part of the mount foot of its southern neighbor module.

Figure 21A:
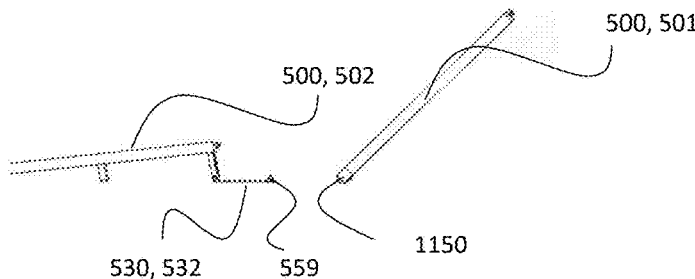
FIGS. 21A-21E show side views of a framed PV module with integrated mounting system with a hook and a wheel or sphere being engaged with a southern neighbor module. Said wheel or sphere can also be used to facilitate easy alignment during installation.
Figure 21B:
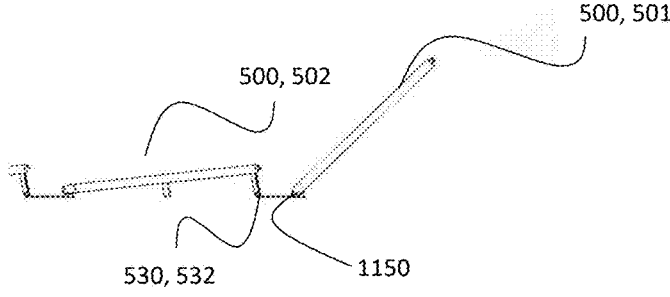
Figure 21C:
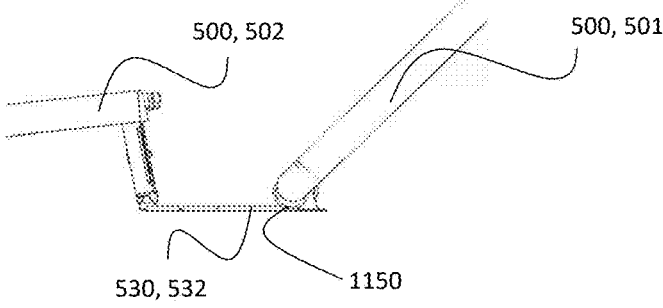
Figure 21D:
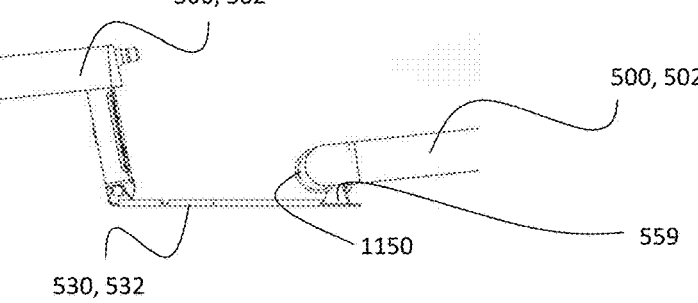
Figure 21E:
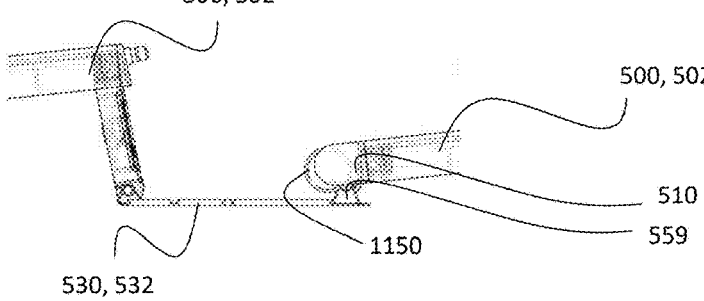

FIG. 21A shows the northern neighbor module 500, 501 being approached toward already installed southern neighbor module 500, 502. FIG. 21B shows same northern neighbor module engaging with southern neighbor module, by wheeling it onto the engaged mounting foot 530, 532 of southern neighbor module. FIG. 21C is a close-up of FIG. 21B; in FIG. 21D, the northern neighbor module is engaging with southern neighbor module by rotating hooks 510 (not visible here) around engagement bar 559 (not visible here). FIG. 21E shows silhouette of connecting hook 510 behind wheel 1150.

Figures 22A, 22B:
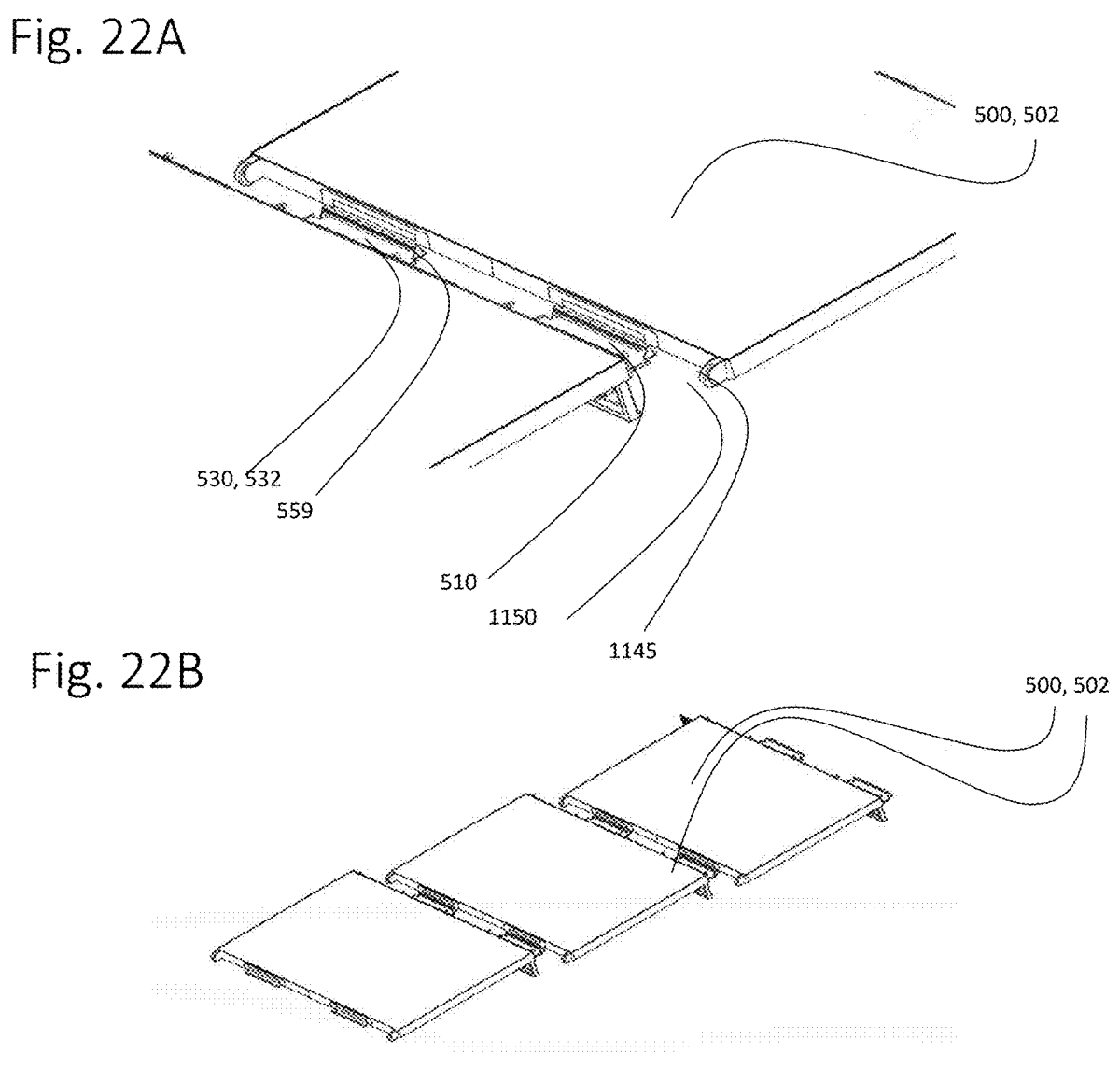

FIGS. 22A and 22B show framed PV module with integrated mounting system 500, 502 which comprises wheels along its southern edge in an engaged and installed position. Also shown are wheels 1150 and wheel receptacles 1145, mount feet 503, 532 and connecting hooks 510. FIG. 22A shows a top view close-up of the engaged modules 500, 502, whereas FIG. 22B shows a series of three such engaged modules. PV modules are connected via connecting hooks 510, mating with engagement bars 559 of southern neighbor PV module's mount feet.

Figure 23:
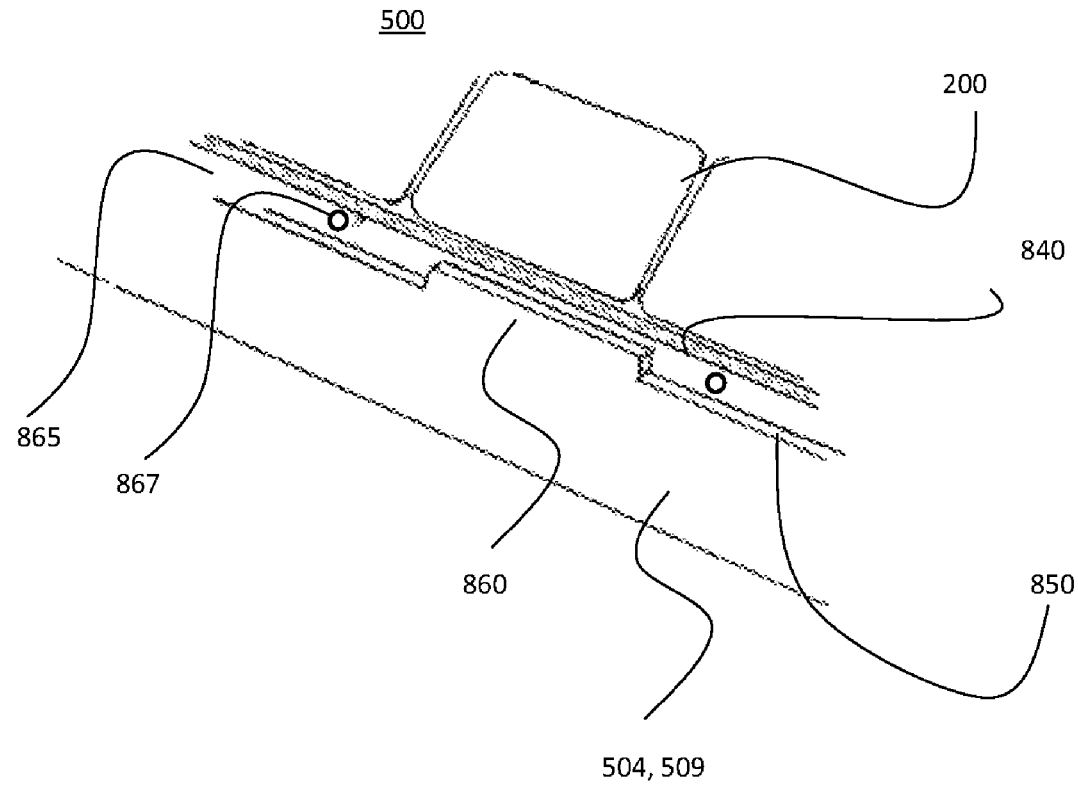
FIG. 23 depicts a feature along the south edge of a framed PV module which enables enhanced draining while retaining safe PV module and system stacking during transport.

FIG. 23 depicts a feature that enhances water drainage capability of the molded PV frame. Enhanced drainage capability is very beneficial to avoiding soiling of PV modules. Common modules with A1 frames over time often accumulate dirt along their southern edge due to incomplete drainage, as a standard A1 frame tends to be taller than the PV laminate surface and thus contributes to holding back residue from drainage. The presented feature substantively improves the drainage and reduces soiling. Shown in this FIG. 23 here is a south edge of a framed PV module 500. The PV laminate 200 with the cells has a surface which sits taller than the rim 850 of the southern edge 509 of the PV module's frame 504, so that rain water and debris flow off easily and cannot accumulate. For easy stacking capability and to prevent the laminate edge from damage during stacking, a distancing lip or a plurality of distancing lips 860 is molded as part of the module frame edge along the southern edge 5090. Said distancing lips are preferably designed such that their upper edges are higher than the glass surface of the PV laminate, thereby enabling stacking of modules without resting on the southern glass edges 840 of the laminates. For other edges (not shown in detail here), the PV frame may be a little higher than the laminate, since it is sufficient if the water can drain at the lowest area, along the southern edge of the panel. Also depicted is the ledge 865 which the PV laminate 200 rests on or is preferably glued onto. Said ledge 865 is part of the PV module frame 504 and said ledge may have a gap between the southern edge 840 of the PV laminate 200 and the southern rim 850 of the PV frame 504, 509. Said ledge may contain drain holes 867 to further facilitate draining of water from said edges.

Figure 24A:
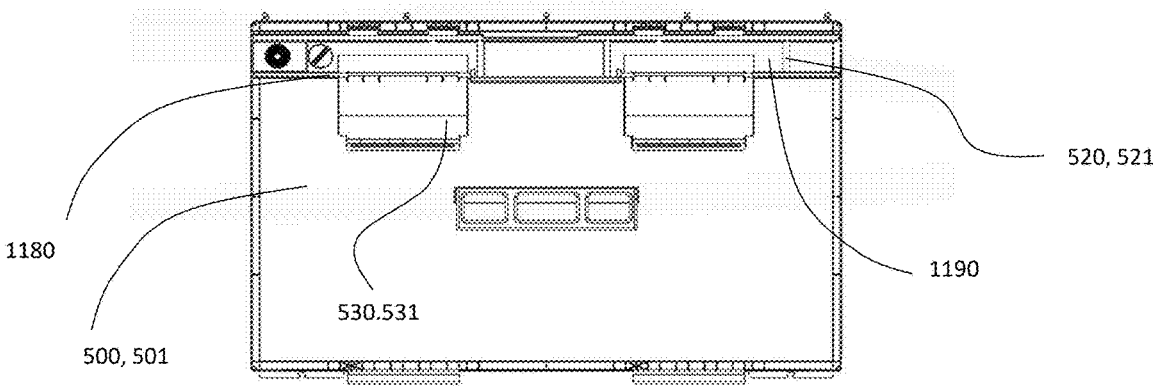
FIGS. 24A-24C show framed PV modules with integrated mounting system, wherein the pivot point of the mount feet is partially recessed, enabling mount feet and pavers in case of ballasted installation to be partially underneath said PV module and thus enabling tight module pitch.
Figure 24B:
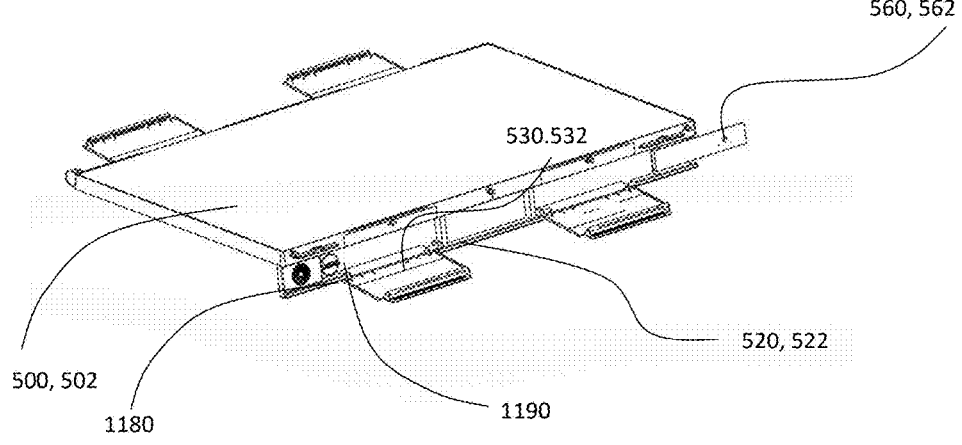
Figure 24C:
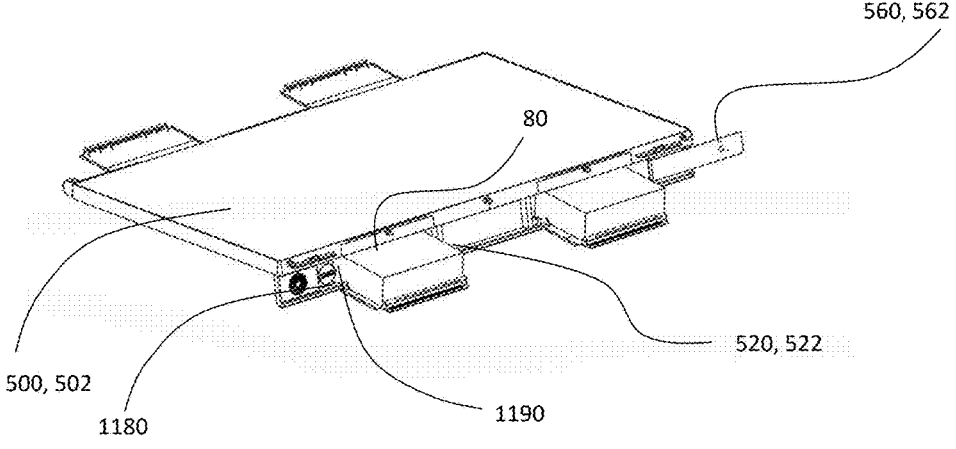

FIGS. 24A-24C depict a PV module with integrated mounting system 500, wherein said rotatable mount foot 530 has a pivoting point 1180 which is recessed partially into the mount foot and wherein said frame mount 520 has a recess 1190 to allow for said mount foot to be rotated into a folded position within the confines of the PV module frame for stacking and transportation and wherein said partially recessed pivoting point of said mount foot allows for said mount foot to be placed partially underneath said PV module during installation and thus allow for tighter module spacing and wherein said recess in said frame mount allows for a paver 80 to be placed on said recessed mount foot 530, such that said paver is partially underneath said PV module. FIG. 24A shows said PV module 500, 501 with components folded in, such as frame mount 520, 521 folded in and mount feet 530, 531 folded in, and in an orientation such that mount feet 530, 531 are folded 180 degrees from frame mount 520, 521. FIG. 24B shows said PV module 500, 502 in an installed position with components folded out 502. Frame mount 520, 522 is folded out and so are mount feet 530, 532, as well as east-west connecting panel 560, 562. FIG. 24C shows the placement of pavers 80 onto mount feet 530, 532, wherein said pavers partially are moved in underneath the surface of said PV module, thereby enabling a tight north-south spacing of adjacent modules.

Figures 25A, 25B:
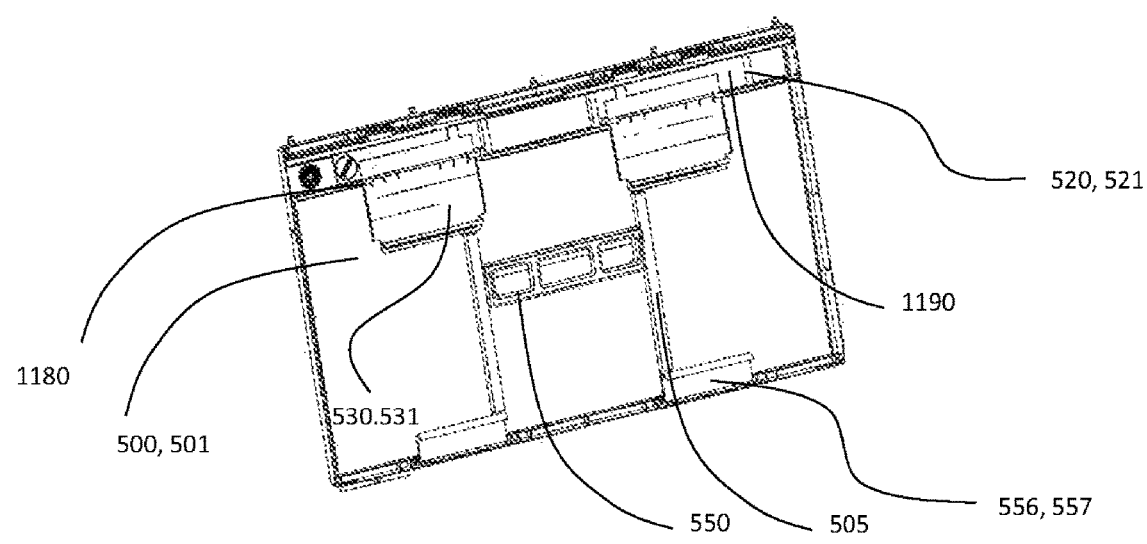
FIGS. 25A and 25B show framed PV modules with integrated mounting system, wherein the pivot point of the mount feet is partially recessed, enabling mount feet and pavers in case of ballasted installation to be partially underneath said PV module and thus enabling tight module pitch, wherein said PV modules also contain supporting cross bars, as well as rotatable elevating bars with connecting hooks.

FIGS. 25A and 25B depict a similar embodiment as FIGS. 24A and 24B, namely PV modules with integrated mounting systems 500, 502 with recessed mount feet 530, 531, but the depicted embodiment is with elevating bars with connecting hooks 556 that are part of the south edge of said PV modules and wherein FIG. 25A shows elevating bars with connecting hooks 556, 557 folded into the confines of the PV module frame, whereas FIG. 25B shows same elevating bars with connecting hooks 556, 558 rotated out for installation. Supporting cross bars 550 are also shown and said supporting cross bars preferably support the snow mount 550, which can also be used as a handle for carrying said PV module with integrated mounting system.

The PV module frame, mount and installation concepts presented in this disclosure typically have distinct features along the south and north edges of the modules, as well as potentially along their east and west edges. Examples are the hooks with extensions, the elevating bars, on the south edges and pins along the north edges that hold wind deflectors. However, for symmetry reasons and ease of manufacturing, it is conceived that, at the cost of redundancy or by molding several separate parts and mating them after molding, a symmetrical structure or frame can be devised, using the concepts disclosed herein.

In addition, certain inventions herein are disclosed, in varying level of detail, as part of one or some of the presented embodiments. In addition, several useful features which are described in this disclosure as part of a north south oriented structure, are applicable to east-west installation geometries as well. It is clear to someone with reasonable knowledge of the field to be able to apply or combine features shown in one embodiment to or with features of another disclosed embodiment and to apply general useful features from a north-south arrangement to an east-west installation arrangement . Such combinations and transferred application of disclosed concepts are intended to be covered by this enclosure in their entirety.

What is claimed is:

1. A photovoltaic (PV) system, comprising:
   a PV laminate with a frame, together comprising a PV module;
   the frame having a frame mount along one frame edge to elevate the frame edge of the PV module;
   the frame mount being rotatable and folded in underneath the frame for stacking and transportation into a folded position and rotated out and unfolded for installation;
   the frame mount further having mount feet attached in a rotatable way;
   the mount feet having an engagement bar;
   wherein the mount feet are compatible with an adhesive mounting to a roof by having an adhesive layer attached to the side of the mount feet that is to mate with the roof top and wherein the adhesive layer is protected by a release liner that is removed prior to installation;
   wherein the mount feet are also compatible with ballasted mounting to a roof by providing space and at least partial confinement for at least one paver to be placed on top of at least one of the mount feet;
   wherein the frame further comprises at least one elevating bar, located along the frame edge opposite of the frame edge containing the frame mount,
   wherein the frame edge opposite of the frame edge containing the frame mount is lifted up by the at least one elevating bar to an extent that prevents shading along the opposite frame edge from a paver placed on at least one of the mount feet;
   wherein the elevating bar is attached to the frame along a frame edge opposite to the frame edge which has the frame mount attached to it;
   wherein the elevating bar comprises at least one connecting hook configured to engage with an engagement bar which is part of one of the mount feet of a neighbor PV module;
   wherein the elevating bar is attached to the frame in a rotatable and foldable way;
   wherein the elevating bar is rotated and folded to be within the confines of the frame for stacking and transportation; and wherein the elevating bar is rotated and folded out into a position essentially vertical to the plane of the roof for installation.

2. The PV system of claim 1, wherein the mount feet are arranged for stacking and transportation in an orientation which is pivoted by 180 degrees from the orientation of the frame mount in its folded position.

3. The PV system of claim 1, wherein the frame mount comprises on one side a hinged east-west connection panel, wherein the frame mount further comprises a transportation location for the east-west connection panel where the east-west connection panel is folded in for transport, the east-west connection panel comprising a serrated feature along one side of the east-west connection panel which is to mate with the neighbor PV module;

the frame mount further comprising an east-west connection recipient location on the side opposed to the side comprising the east-west connection panel, the east-west connection recipient location being the location where the east-west connection panel of a neighbor PV module is mated to the PV system;

the east-west connection recipient location comprising a matching serrated feature to be mated to the serrated feature of east-west connection panel of its neighbor module;

the east-west connection recipient location further comprising locking pin receptacle locations;

the east-west connection panel further comprising a locking receptacle;

the frame mount further comprising a rotatable locking latch comprising locking pins and a locking latch snap fixture and a transport location for the locking latch, wherein the locking latch is rotated and folded into a storage position flush with the frame mount for transportation, wherein further the east-west connection panel is rotated and folded into a storage position flush with the frame mount (for transportation and wherein the east-west connection panel is rotated out for installation to a mating position for connection to its neighbor PV module, and wherein the rotatable locking latch is rotated and folded onto the east-west connection recipient location, enclosing the east-west connection panel for a tight connection by engaging the east-west connection panel using the locking latch and locking receptacle location on east-west connection panel and by engaging with the underlying east-west connection recipient location using the locking pins and locking pin receptacle locations, and wherein the serrated features on east-west connection panel and east-west connection recipient location provide angle adjustment to accommodate uneven roof surfaces.

4. The PV system of claim 1, wherein the frame and mounting structures are comprised of at least one of: a polymer and a fiber reinforced polymer material.

5. The PV system in claim 1, further comprising at least one rotatable snow mount which is rotated into a folded position to be within the confines of the PV module for stacking and transportation and being rotated out into an engaged position for installation.

6. The PV system in claim 5, wherein the snow mount is also a handle for carrying the PV system, wherein the handle is placed in a central position with respect to east and west edge of the frame, and wherein the handle is placed in a position wherein an installer, when carrying the PV system with the north frame edge up, can readily reach the handle with their hands.

7. The PV system in claim 1, wherein the frame mount comprises on one side a hinged east-west connection panel, wherein the frame mount further comprises a transportation location for the east-west connection panel where the the east-west connection panel comprising a serrated feature along one side of the east-west connection panel which is configured to mate with the neighbor PV module, said frame mount further comprising an east-west connection recipient location on the side opposed to the side comprising the east-west connection panel, the east-west connection recipient location being the location where the east-west connection panel of a neighbor PV module is mated to the PV system, the east-west connection recipient location comprising a matching serrated feature to be mated to the serrated feature of east-west connection panel of its neighbor PV module, the frame mount further comprising an east-west connection screw and a transport location for the east-west connection screw, wherein the east-west connection panel is rotated and folded into a storage position flush with the frame mount for transportation, and wherein the east-west connection panel is rotated out for installation to a mating position for connection to its neighbor PV module, and wherein the east-west connection screw is attached to the east-west connection recipient location for a tight connection, and wherein the serrated features on east-west connection panel and east-west connection recipient location provide angle adjustment to accommodate uneven roof surfaces.

8. The PV system in claim 1, further comprising a set of distancing lips which are part of the rim of the southern edge of the frame of the PV module, wherein the distancing lips have a height taller than the surface of the PV laminate, wherein the remainder of the rim of the southern edge of the frame of the PV module is lower than the surface of the PV laminate, and wherein this arrangement allows for improved draining of water via the southern edge of the PV module.

9. The PV system in claim 1, wherein at least one of the rotatable mount feet has a pivoting point recessed partially into the mount feet, and wherein the frame mount has a recess to allow for the mount feet to be rotated into a folded position within the confines of the frame of the PV module for stacking and transportation, and wherein the partially recessed pivoting point of the mount feet allows for the mount feet to be placed partially underneath the PV module during installation and thus allows for tighter module spacing, and wherein the recess in the frame mount allows for a paver to be placed on the recessed mount feet, such that the paver is partially underneath the PV module.

10. The PV system in claim 1, further comprising North side wind deflectors configured to be snapped on to connecting points along the frame edge of the PV modules, and wherein the mount feet have lips that define the wind deflectors in their position.

11. The PV system in claim 1 further comprising:

wheel receptacles with attached wheels, wherein the wheels are mounted on the side opposing the side where said frame mount is attached, the wheels configured to allow an installer to roll the PV module along the surface of a stack of PV modules;

the wheels configured to allow an installer to roll the PV module along the surface of a roof;

the wheels also configured to guide the PV modules connecting hooks into the engagement bar of mount feet of the neighbor module.

12. A photovoltaic (PV) system, comprising:

a PV laminate with a frame, together forming a PV module, the frame having a frame mount along one frame edge to elevate the frame edge of the PV module;

the frame mount is configured to be rotatable and folded in underneath the frame for stacking and transportation into a folded position and rotated out and unfolded for installation;

the frame mount further comprising mount feet attached in a rotatable way;

the mount feet comprising an engagement bar;

the frame further comprising connecting hooks on the side opposing the side where the frame mount is attached;

the connecting hooks able to engage with mount feet of a neighbor module by rotating the PV modules around such that the connecting hooks connect with an engagement bar which is part of the neighbor PV modules mount feet;

wherein the mount feet are compatible with an adhesive mounting to a roof by having an adhesive layer attached to the side of the mount feet that is to mate with the roof top and wherein the adhesive layer is protected by a release liner that is removed prior to installation;

wherein the mount feet are also compatible with ballasted mounting to a roof by providing space and at least partial confinement for at least one paver to be placed on top of at least one of the mount feet;

wherein each mount foot further comprises an elevating bar and the frame edge opposite of the frame edge containing the frame mount is lifted up by the at least one elevating bar to an extent that prevents shading along the opposite frame edge from a paver placed on at least one of the mount feet;

wherein the elevating bar is rotatable around a hinge which is part of the mount foot, and wherein for transport and stacking this elevating bar is rotated into a position flush with the mount foot, and the mount foot with attached elevating bar is rotated and folded into the confines of the frame for transportation, wherein frame mount, mount foot, and elevating bar are all rotated and unfolded into place for installation, with the mount foot being rotated around its hinge with the frame mount and with the elevating bar being rotated around its hinge with the mount foot; and wherein the rotatable elevating bar serves to enable lifting the edge of another neighbor PV module, and wherein the elevating bar comprises an opening in the elevating bar which is able to engage the connecting hooks of the another neighbor PV module.

13. The PV system of claim 12, wherein the elevating bar further comprises a support and guidance ledge configured to support the weight of the PV module and guide the connecting hooks towards the opening in the elevating bar for engagement.

14. The PV system of claim 12, wherein the mount feet are arranged for stacking and transportation in an orientation which is pivoted by 180 degrees from the orientation of the frame mount in its folded position.

15. The PV system in claim 12, further comprising at least one rotatable snow mount which is rotated into a folded position to be within the confines of the PV module for stacking and transportation and being rotated out into an engaged position for installation, wherein the snow mount is also a handle for carrying the PV system, wherein the handle is placed in a central position with respect to east and west edge of the frame, and wherein the handle is placed in a position wherein an installer, when carrying the PV system with the north frame edge up, can readily reach the handle with their hands.

16. A photovoltaic system, comprising:

a PV laminate with a frame, together forming a PV module, the frame having a frame mount along one frame edge to elevate the frame edge of the PV module;

the frame mount being rotatable and folded in underneath the frame for stacking and transportation into a folded position and rotated out and unfolded for installation;

the frame mount further having mount feet (attached in a rotatable way;

the mount feet having an engagement bar;

wherein the mount feet are compatible with an adhesive mounting to a roof by having an adhesive layer attached to the side of the mount feet that is to mate with the roof top, and wherein the adhesive layer is protected by a release liner that is removed prior to installation;

wherein the mount feet are also compatible with ballasted mounting to a roof by providing space and at least partial confinement for at least one paver to be placed on top of at least one of the mount feet:

wherein the frame further comprises an elevating bar, located along the frame edge opposite of the frame edge containing the frame mount;

wherein the frame edge opposite of the frame edge containing the frame mount is lifted up by the elevating bar to an extent that prevents shading along the opposite frame edge from a paver placed on at least one of the mount feet;

wherein each elevating bar comprises at least one connecting hook configured to engage with an engagement bar which is part of each mount foot of a neighbor PV module, and wherein the elevating bar is a fixed part of the frame edge which is opposite to the frame edge to which the frame mount is attached to; and wherein the connecting hooks are configured to engage with mount feet of a neighbor PV module by rotating the PV modules around such that the connecting hooks connect with an engagement bar which is part of the neighbor PV modules mount feet.

17. The PV system of claim 16, wherein the mount feet are arranged for stacking and transportation in an orientation which is pivoted by 180 degrees from the orientation of the frame mount in its folded position.

18. The PV system in claim 16, further comprising at least one rotatable snow mount which is rotated into a folded position to be within the confines of the PV module for stacking and transportation and being rotated out into an engaged position for installation, wherein the snow mount is also a handle for carrying the PV system, wherein the handle is placed in a central position with respect to east and west edge of the frame, and wherein the handle is placed in a position wherein an installer, when carrying the PV system with the north frame edge up, can readily reach the handle with their hands.

19. The PV system in claim 16, further comprising a set of distancing lips which are part of the rim of the southern edge of the frame of the PV module, wherein the distancing lips have a height taller than the surface of the PV laminate, wherein the remainder of the rim of the southern edge of the frame of the PV module is lower than the surface of the PV laminate, and wherein this arrangement allows for improved draining of water via the southern edge of the PV module.

20. The PV system in claim 16, further comprising North side wind deflectors configured to be snapped on to connecting points along the frame edge of the PV modules, and wherein the mount feet have lips that define the wind deflectors in their position.

\* \* \* \* \*